(12) United States Patent
Gou et al.

(10) Patent No.: US 11,356,210 B2
(45) Date of Patent: Jun. 7, 2022

(54) DATA VERIFICATION INFORMATION GENERATION AND FEEDBACK METHOD, DATA VERIFICATION INFORMATION RECEIVING METHOD AND DEVICE

(71) Applicant: ZTE CORPORATION, Shenzhen (CN)

(72) Inventors: Wei Gou, Shenzhen (CN); Peng Hao, Shenzhen (CN); Feng Bi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 156 days.

(21) Appl. No.: 16/638,217

(22) PCT Filed: Aug. 10, 2018

(86) PCT No.: PCT/CN2018/100036
§ 371 (c)(1),
(2) Date: Feb. 11, 2020

(87) PCT Pub. No.: WO2019/029719
PCT Pub. Date: Feb. 14, 2019

(65) Prior Publication Data
US 2020/0366420 A1    Nov. 19, 2020

(30) Foreign Application Priority Data
Aug. 11, 2017    (CN) .......................... 201710687786.2

(51) Int. Cl.
*H04L 1/18*    (2006.01)
*H04L 1/00*    (2006.01)
*H04L 1/08*    (2006.01)

(52) U.S. Cl.
CPC .......... *H04L 1/1816* (2013.01); *H04L 1/0027* (2013.01); *H04L 1/0057* (2013.01); *H04L 1/08* (2013.01)

(58) Field of Classification Search
None
See application file for complete search history.

(56) References Cited

U.S. PATENT DOCUMENTS

2018/0270023 A1* 9/2018 Jiang ................. H03M 13/6306
2018/0278379 A1* 9/2018 Sun ....................... H04L 1/0061
(Continued)

FOREIGN PATENT DOCUMENTS

CN    1983913 A    6/2007
CN    105515719 A    4/2016
(Continued)

OTHER PUBLICATIONS

Samsung et al. "WF on CBG Retransmission" 3GPP TSG RAN1-NR#2, RI-1711958, Jun. 30, 2017, pp. 8, 10 and 11.
(Continued)

*Primary Examiner* — Jeffrey M Rutkowski
*Assistant Examiner* — Basil Ma
(74) *Attorney, Agent, or Firm* — Bond Schoeneck & King, PLLC; George McGuire

(57) ABSTRACT

A data acknowledgement information generation and feedback method is provided. The method includes steps described below. UE determines an actual valid CBG level HARQ-ACK bit of a transmission block according to a number of CBGs actually scheduled in last transmission of the transmission block or according to a number of CBGs actually scheduled in initial transmission of the transmission block, generates and transmits an HARQ-ACK containing the actual valid CBG level HARQ-ACK bit. A data acknowledgement information receiving method, a data acknowl-
(Continued)

edgement information generation and feedback device, a data acknowledgement information receiving device, a UE, a base station and a storage medium are further provided.

17 Claims, 4 Drawing Sheets

(56) References Cited

U.S. PATENT DOCUMENTS

| | | | |
|---|---|---|---|
| 2018/0287744 A1* | 10/2018 | Sundararajan | H04L 1/1635 |
| 2018/0287745 A1* | 10/2018 | Sun | H04L 1/0013 |
| 2019/0007170 A1* | 1/2019 | Sun | H04L 1/0061 |
| 2019/0158230 A1* | 5/2019 | Chen | H04L 1/0057 |

FOREIGN PATENT DOCUMENTS

| | | |
|---|---|---|
| CN | 106788918 A | 5/2017 |
| CN | 106888074 A | 6/2017 |
| CN | 106953718 A | 7/2017 |
| WO | 2016126653 A1 | 8/2016 |

OTHER PUBLICATIONS

ZTE. "DL Control for CBG" 3GPP TSG RAN WGI NR Ad-Hoc#2, RI-1710018, Jun. 30, 2017, entire document.
International Search Report and Written Opinion Form PCT/ISA/210 and PCT/ISA237, International Application No. PCT/CN2018/100036 pp. 1-5, International Filing Date Aug. 22, 2017, dated Nov. 1, 2018.
Lenovo et al: "UL HARQ-ACK feedback for CBG-based retransmission", 3GPP Draft; R1-1710604, 3rd Generation Partnership Project (3GPP), Mobile Competence Centre; 650, Route Des Lucioles; F-06921 Sophia-Antipolis Cedex; France.
Intel Corporation: "HARQ-ACK feedback for 1-15 CBG-based (re) transmissions", 3GPP Draft; R1-1710571, 3rd Generation Partnership Project (3GPP), Modile Competence Centre; 650 Route Des Lucioles; F-06921 Sophia-Antipolis Cedex; France.
Supplementary European Search Report, dated Mar. 21, 2021. pp. 1-10.
Translated Chinese Search Report.
Translated Chinese Office Action.
"WF on CBG retransmission" 3GPPTSN RAN1-NR#2; R1, publication date Jun. 30, 2017.

* cited by examiner

DATA VERIFICATION INFORMATION GENERATION AND FEEDBACK METHOD, DATA VERIFICATION INFORMATION RECEIVING METHOD AND DEVICE

This disclosure is a U.S. National Stage Application, filed under 35 U.S.C. 371, of International Patent Application No. PCT/CN2018/100036, filed on Aug. 10, 2018, which is based on and claims priority to Chinese patent application No. 201710687786.2 filed on Aug. 11, 2017, the disclosure of which are incorporated herein by reference in their entireties.

TECHNICAL FIELD

The present disclosure relates to the field of communications and, in particular, relates to data acknowledgement information generation and feedback method and device, and data acknowledgement information receiving method and device.

BACKGROUND

A new generation mobile communication system (new radio, NR for short) is being studied and standardization is being performed, which is also one of priorities in the current 3rd generation partnership project (3GPP). It is discussed in related technology that for one time of data transmission, there are following two possible candidate approaches for feeding back code block group level hybrid automatic repeat request acknowledgement (CBG level HARQ-ACK):

approach 1: the CBG level HARQ-ACK is fed back based on the number of CBGs actually scheduled for transmission; and approach 2: the CBG level HARQ-ACK is fed back based on the number of configured CBGs.

In the above two approaches, the number of CBGs determined in approach 1 is dynamic, and a general overhead is relatively small, thus the energy consumption is saved and the coverage is improved; the number of CBG determined in approach 2 is semi-static, the general overhead is relatively large but the number of feedback bits is stable.

The approach 1, if used, will result in following problems.

For example, when a data transport block (TB) is initially transmitted, it is required to form a CBG level HARQ-ACK according to 4 CBGs, it is assumed that each CBG corresponds to one bit, user equipment (UE) forms a corresponding feedback of "1100" after the TB is received, that is, first two CBGs are correctly decoded, while third and fourth CBGs are not correctly decoded. A base station receives feedback information, but decoding on the base station side is incorrect, for example, a decoding result of "1110", that is, the base station considers first three CBGs have been correctly decoded by the UE, and the fourth CBG needs to be retransmitted. Then, the base station retransmits the fourth CBG to the UE, at this time, the UE determines that the number of CBG is 1 according to approach 1, so one bit is fed back accordingly; assuming that the UE correctly decodes the fourth CBG, the UE feeds back "1" to the base station, besides, assuming that the base station has correctly received the feedback, then the base station at this time considers this transmission to be successful. And the base station thinks that the whole TB has been correctly received by the UE, but in fact the UE did not correctly receive the third CBG. At this moment, the base station no longer schedules the TB, which will result in a decoding error of the TB on the UE side.

SUMMARY

The present disclosure provides data acknowledgement information generation and feedback method and device, and data acknowledgement information receiving method and device, which can solve the problem of reliability of CBG retransmission in the related arts.

In an embodiment, the present disclosure discloses a data acknowledgement information generation and feedback method, the method includes steps described below.

For a transmission block, user equipment (UE) determines an actual valid code block group (CBG) level hybrid automatic repeat request acknowledgement (HARQ-ACK) bit of the transmission block according to a number of CBGs actually scheduled in last transmission of the transmission block or according to a number of CBGs actually scheduled in initial transmission of the transmission block, generates and transmits an HARQ-ACK containing the actual valid CBG level HARQ-ACK bit.

In an embodiment, the present disclosure discloses a data acknowledgement information receiving method, the method includes steps described below.

For a transmission block, a base station determines an actual valid CBG level HARQ-ACK bit of the transmission block according to a number of CBGs actually scheduled in last transmission of the transmission block or a number of CBGs actually scheduled in initial transmission of the transmission block, and receives an HARQ-ACK containing the actual valid CBG level HARQ-ACK bit of the transmission block;

the base station determines a CBG to be retransmitted according to the received HARQ-ACK containing the actual valid CBG level HARQ-ACK bit, and retransmits the determined CBG to be retransmitted.

In an embodiment, the present disclosure further discloses a data acknowledgement information generation and feedback method, the method includes steps described below.

For a transmission block, UE determines a code block (CB) contained in each CBG in retransmission of a transmission block to be identical with a CB contained in the each CBG in initial transmission of the transmission block, and determines a value of an actual valid CBG level HARQ-ACK bit of the transmission block according to at least one of:

when the UE performs an HARQ-ACK feedback on the retransmission of the transmission block, the UE feeds back a positive acknowledgement (ACK) for a previously correctly received CBG;

when the UE performs the HARQ-ACK feedback on the retransmission of the transmission block, the UE feeds back a negative acknowledgement (NACK) for a CBG to be retransmitted that is not retransmitted current time; or when the UE performs the HARQ-ACK feedback on the retransmission of the transmission block, the UE determines a feedback of a CBG to be retransmitted that has been retransmitted current time as an ACK or NACK according to a decoding result of the CBG;

where, the CBG to be retransmitted includes a CBG that is not correctly received by the UE previously or a CBG that is fed back with an NACK by the UE previously. The previously correctly received CBG includes a previously correctly received CBG, which is retransmitted again in current retransmission, or a previously correctly received CBG, which does not continue to be transmitted again in current transmission.

In an embodiment, the present disclosure further discloses a data acknowledgement information receiving method, the method includes steps described below.

A base station determines a CB contained in each CBG in retransmission of a transmission block to be identical with a CB contained in the each CBG in initial transmission of the transmission block, when the transmission block is initially transmitted or retransmitted, the base station determines an actual valid CBG level HARQ-ACK bit of the transmission block according to a number of CBGs actually scheduled in the initial transmission of the transmission block;

where, the retransmission of the transmission block includes retransmission of partial or all CBGs of the transmission block; the retransmission of the transmission block further includes performing at least one retransmission of the transmission block.

In an embodiment, the present disclosure further discloses a data acknowledgement information generation and feedback method, the method includes steps described below.

When UE receives a CBG retransmitted by a base station through downlink control information (DCI), if the UE determines that a CBG indication in the DCI is inconsistent with an actual valid CBG level HARQ-ACK fed back by the UE to the base station, the UE determines an actual valid CBG level HARQ-ACK bit according to a set rule, and generates an HARQ-ACK containing the actual valid CBG level HARQ-ACK bit; and the generated HARQ-ACK containing the actual valid CBG level HARQ-ACK bit is fed back to the base station.

In an embodiment, the present disclosure further discloses a data acknowledgement information receiving method, the method includes steps described below.

A base station determines an actual valid CBG level HARQ-ACK bit according to a set rule; receives an HARQ-ACK containing the actual valid CBG level HARQ-ACK bit fed back by UE, determines a CBG to be retransmitted, and retransmits the determined CBG to be retransmitted.

In an embodiment, the present disclosure further discloses a data acknowledgement information generation and feedback device, the device includes an acknowledgement information generation unit and an acknowledgement information feedback unit.

The acknowledgement information generation unit is configured to determine an actual valid CBG level HARQ-ACK bit of a transmission block according to a number of CBGs actually scheduled in last transmission of the transmission block or according to a number of CBGs actually scheduled in initial transmission of the transmission block, and generate an HARQ-ACK containing the actual valid CBG level HARQ-ACK bit;

the acknowledgement information feedback unit is configured to transmit the generated HARQ-ACK containing the actual valid CBG level HARQ-ACK bit.

In an embodiment, the present disclosure further discloses a data acknowledgement information receiving device, the device includes an acknowledgement information acquisition unit and a transmitting unit.

The acknowledgement information acquisition unit is configured to determine an actual valid CBG level HARQ-ACK bit of the transmission block according to a number of CBGs actually scheduled in last transmission of the transmission block or a number of CBGs actually scheduled in initial transmission of the transmission block, and receive an HARQ-ACK containing the actual valid CBG level HARQ-ACK bit of the transmission block; and the transmitting unit is configured to determine a CBG to be retransmitted according to the received HARQ-ACK containing the actual valid CBG level HARQ-ACK bit, and retransmit the determined CBG to be retransmitted.

In an embodiment, the present disclosure further discloses a data acknowledgement information generation and feedback device, the device includes an acknowledgement information generation unit and an acknowledgement information feedback unit.

The acknowledgement information generation unit is configured to determine a CB contained in each CBG in retransmission of the transmission block to be identical with a CB contained in the each CBG in initial transmission of the transmission block, and determine a value of an actual valid CBG level HARQ-ACK bit of the transmission block according to at least one of:

the acknowledgement information feedback unit is configured to feed back an ACK for a previously correctly received CBG, when an HARQ-ACK feedback is performed on the retransmission of the transmission block;

the acknowledgement information feedback unit is configured to feed back an NACK for a CBG to be retransmitted that is not retransmitted current time, when the HARQ-ACK feedback is performed on the retransmission of the transmission block; or the acknowledgement information feedback unit is configured to determine a feedback for a CBG to be retransmitted that has been retransmitted current time as an ACK or an NACK according to a decoding result of the CBG, when the HARQ-ACK feedback is performed on the retransmission of the transmission block;

where, the CBG to be retransmitted includes a CBG that is not correctly received by the UE previously or a CBG that is fed back with an NACK by the UE previously. The previously correctly received CBG includes a previously correctly received CBG, which is retransmitted again in current retransmission, or a previously correctly received CBG, which does not continue to be transmitted again in current transmission.

In an embodiment, the present disclosure further discloses a data acknowledgement information receiving device, the device includes an acknowledgement information acquisition unit.

The acknowledgement information acquisition unit is configured to determine a contained in each CBG in retransmission of the transmission block to be identical with a CB contained in the each CBG in initial transmission of the transmission block, and in response to the initial transmission of the transmission block or the retransmission of the transmission block, and to determine an actual valid CBG level HARQ-ACK bit of the transmission block according to a number of CBGs actually scheduled in the initial transmission of the transmission block;

where, the retransmission of the transmission block includes retransmission of part or all CBGs of the transmission block; the retransmission of the transmission block further includes performing at least one retransmission of the transmission block.

In an embodiment, the present disclosure further discloses a data acknowledgement information generation and feedback device, the device includes an acknowledgement information generation unit and an acknowledgement information feedback unit.

The acknowledgement information generation unit is configured to when a CBG retransmitted by a base station through DCI is received, if it is determined that a CBG indication in the DCI is inconsistent with an actual valid CBG level HARQ-ACK fed back by UE to the base station, determine an actual valid CBG level HARQ-ACK bit according to a set rule, and generate an HARQ-ACK containing the actual valid CBG level HARQ-ACK bit; and the acknowledgement information feedback unit is configured to feed back the generated HARQ-ACK containing the actual valid CBG level HARQ-ACK bit to the base station.

In an embodiment, the present disclosure further discloses a data acknowledgement information receiving device, the device includes an acknowledgement information acquisition unit and a transmitting unit.

The acknowledgement information acquisition unit is configured to determine an actual valid CBG level HARQ-ACK bit according to a set rule, receive an HARQ-ACK containing the actual valid CBG-level HARQ-ACK bit fed back by UE, and determine a CBG to be retransmitted; and the transmitting unit is configured to retransmit the determined CBG to be retransmitted.

In an embodiment, the present disclosure further discloses UE, including a memory, a processor and a computer program stored on the memory and executable on the processor, when the processor executes the computer program, it implements any one of the above-mentioned data acknowledgement information generation and feedback methods or the above-mentioned data acknowledgement information receiving methods.

In an embodiment, the present disclosure further discloses a base station, including a memory, a processor and a computer program stored on the memory and executable on the processor, when the processor executes the computer program, it implements any one of the above-mentioned data acknowledgement information generation and feedback methods or the above-mentioned data acknowledgement information receiving methods.

In an embodiment, the present disclosure further discloses a computer storage medium, storing a computer program, when the computer program is executed by a processor, it performs any one of the above-mentioned data acknowledgement information generation and feedback methods or the above-mentioned data acknowledgement information receiving methods.

DETAILED DESCRIPTION

In embodiments of the present disclosure, actually scheduled, actually transmitted, actually scheduled for transmission, actual retransmission and scheduling, and scheduling and transmission all use the same definition. Last transmission and last scheduling involved in the present disclosure use a same definition. In addition, a transmission block actually scheduled by a base station involved in the present application includes at least one code block, the at least one code block is divided into at least one CBG at a receiving end according to an appointed rule, and a number of CBG(s) obtained through dividing according to the present disclosure is recorded as a number of actually scheduled CBG(s).

Figure 1:
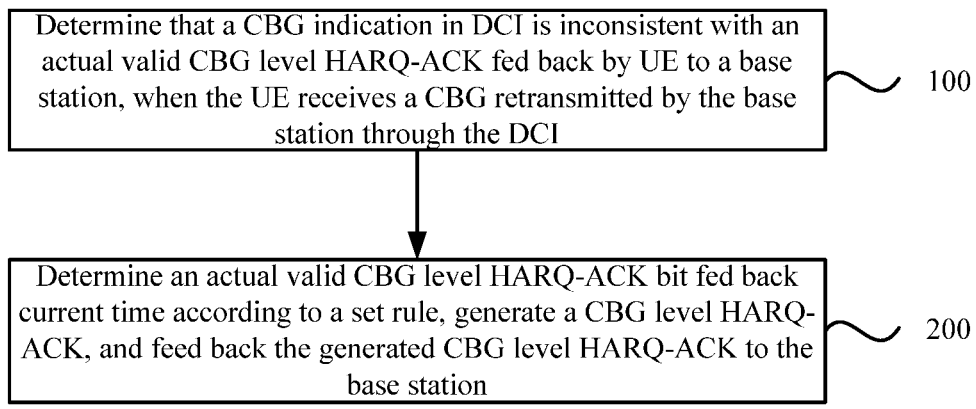
FIG. 1 is a flowchart of a data acknowledgement information generation and feedback method according to an embodiment of the present disclosure.

An embodiment of the present disclosure provides a data acknowledgement information generation and feedback method, which is described from a UE side, as shown in FIG. 1, the method includes steps described below.

Step 100, when a UE receives a CBG retransmitted by a base station through Downlink Control Information (DCI), if it is determined by the UE that a CBG indication in the DCI is inconsistent with a CBG level HARQ-ACK fed back by the UE to the base station, the method proceeds to step 200.

Here, the CBG indication in the DCI is inconsistent with the CBG level HARQ-ACK fed back by the UE to the base station includes:

the CBG indication in the DCI only indicates at least one CBG with an NACK is mistaken as an ACK by the base station side; or the CBG indication in the DCI indicates at least one CBG with an ACK is mistaken as an NACK by the base station side; or the CBG indication in the DCI indicates at least one CBG with an NACK is mistaken as an ACK by the base station side.

In an embodiment, when the UE determines that the CBG indication in the DCI is consistent with the CBG level HARQ-ACK fed back by the UE to the base station, the UE determines a number of bits of a CBG level HARQ-ACK according to a number of scheduled CBGs, and generates the CBG level HARQ-ACK.

The CBG indication in the DCI is consistent with the CBG level HARQ-ACK fed back by the UE to the base station includes:

the CBG indication in the DCI indicates all NACKs and ACKs are correctly decoded by the base station side; or the CBG indication in the DCI indicates all NACKs are correctly decoded by the base station side and at least one ACK is mistaken by the base station as an NACK.

Step 200, the UE determines a CBG level HARQ-ACK bit fed back at the current time according to a set rule, generates a CBG level HARQ-ACK, and feeds back the generated CBG level HARQ-ACK to the base station.

In the present disclosure, the step of determining the CBG level HARQ-ACK bit fed back at the current time according to the set rule includes: determining at least one of a number of bits of the CBG level HARQ-ACK fed back at the current time, a corresponding relationship between each bit of the CBG level HARQ-ACK fed back at the current time and each code block group, or the like.

Where, there are many kinds of the set rule.

For example, the UE determines the CBG level HARQ-ACK bit according to the number of actually scheduled CBGs, generates the CBG level HARQ-ACK, adds first indication information (indication A for short), and feeds back the CBG level HARQ-ACK and the indication A to the base station at the same time. At this time, the indication A may include one of following meanings:

notifying the base station to retransmit the whole transmission block (TB);

notifying the base station to reckon a CBG to be retransmitted next time according to an appointed reckoning rule in combination with a CBG retransmitted at the current time; or notifying the base station of incorrect decoding of the CBG level HARQ-ACK last time.

In another example, the UE determines the CBG level HARQ-ACK bit according to a number of pre-configured CBGs or a number of CBGs in last transmission, generates a CBG level HARQ-ACK, and feeds back the generated CBG level HARQ-ACK to the base station.

Corresponding to the above data confirmation information generation and feedback method, there are also data transmission operations on the base station side, operations on the base station side include steps described below.

The base station determines a CBG level HARQ-ACK bit to be received according to a set rule, receives a CBG level HARQ-ACK fed back by a UE, determines a CBG to be retransmitted, and performs retransmission of the determined CBG.

Where, when the CBG level HARQ-ACK received by the base station has the added first indication information, which is indication A for short (that is, the UE determines the number of bits of the CBG level HARQ-ACK according to the number of actually transmitted CBGs, and notifies, in combination with the indication A, the base station to retransmit data), operations on the base station include steps described below.

When the indication A indicates notifying the base station to retransmit the whole TB, the base station retransmits the whole TB according to the indication A, which may be retransmitting the whole TB for once, or dividing the whole TB into multiple parts and retransmitting the multiple parts through multiple times.

When the indication A indicates notifying the base station to reckon the CBG to be retransmitted next time according to the appointed reckoning rule in combination with the CBG retransmitted at the current time, the base station determines all CBGs in the transmission block except a CBG which is correctly transmitted at the current time according to information of the CBG level HARQ-ACK fed back by the UE at the current time, and retransmits all the determined CBGs.

When the indication A indicates notifying the base station of the incorrect decoding of the CBG level HARQ-ACK last time, the base station retransmits the whole TB.

Besides, the step in which the UE determines the CBG level HARQ-ACK bit according to the set rule and generates the CBG level HARQ-ACK may include steps described below. The CBG level HARQ-ACK bit is determined according to the number of configured CBGs or the number of CBGs in last transmission, and the CBG level HARQ-ACK is generated and fed back to the base station. At this time, the base station side has detection operations correspondingly, that is, in an embodiment, the base station receives and detects the CBG-level HARQ-ACK fed back by the UE according to a number of scheduled CBGs; when it succeeds in detection, the base station considers the CBG-level HARQ-ACK received last time as correct, so a CBG corresponding to the CBG-level HARQ-ACK fed back at the current time by the UE is determined according to the number of scheduled CBGs, so as to determine a CBG fed back with an NACK, and perform retransmission. When there is a failure in receiving and detecting the CBG level HARQ-ACK fed back at the current time by the UE according to the number of scheduled CBGs, then the CBG level HARQ-ACK fed back by the UE is detected again according to a number of pre-configured CBGs or the number of CBGs in last scheduling, if the re-detection succeeds, the base station determines the CBG-level HARQ-ACK received last time as incorrect, at this time, the CBG corresponding to the CBG-level HARQ-ACK fed back by the UE at the current time is determined according to the number of scheduled CBGs or the number of CBGs in last scheduling, so as to determine a CBG fed back with an NACK, and perform retransmission.

The number of configured CBGs involved in the present disclosure refers to the number of CBGs configured by the base station for the UE through a physical layer or high-layer signaling; according to this number, each of one or multiple TBs is divided into CBGs according to the appointed rule, then the number of CBGs corresponding to the CBG level HARQ-ACK is determined according to the number of CBGs obtained through dividing.

The number of actually scheduled CBGs refers to a number of CBGs that the transmitted data is divided into according to the appointed rule. In retransmission, it also refers to a number of actually retransmitted CBGs.

Generally, the number of configured CBGs is greater than or equal to the number of actually scheduled CBGs. When a TB is initially transmitted, if the number of configured CBGs is greater than or equal to a number of CBs contained in the transmitted TB, in general, the number of configured CBGs is equal to the number of actually transmitted CBGs; when the TB is initially transmitted, if the number of configured CBGs is less than the number of CBs contained in the transmitted TB, the number of configured CBGs is generally less than the number of actually transmitted CBGs. For example, a TB includes 4 CBs, and the number of configured CBGs is 4, for the initial transmission, each CBG includes one CB, and there are 4 CBGs in total, at this time, the number of configured CBGs is equal to the number of actually scheduled CBGs; for another example, a TB includes 3 CBs and the number of configured CBGs is 4, for the initial transmission, each CBG includes one CB and there are 3 CBGs in total, at this time, the number of configured CBGs is 4 and the number of actually scheduled CBGs is 3.

An embodiment of the present disclosure further provides a data acknowledgement information generation and feedback method, which is described from the UE side, and the method includes processors described below.

The UE determines the CBG level HARQ-ACK bit according to the number of CBGs in last scheduling or the number of CBGs scheduled in the initial transmission, and generates the CBG level HARQ-ACK, then feeds back the generated CBG level HARQ-ACK to the base station.

In an embodiment, based on the above method, the step in which the UE feeds back the CBG level HARQ-ACK for the initial transmission of the transmission block may include a step described below. The CBG level HARQ-ACK bit may be determined according to the number of CBGs scheduled in the initial transmission of the transmission block, the CBG level HARQ-ACK is generated and then fed back to the base station. In an embodiment, when the UE generates the CBG level HARQ-ACK for the initial transmission of the transmission block according to the above-mentioned method, the first indication information may be added, so the CBG level HARQ-ACK and first indication information are fed back to the base station simultaneously, where the first indication information may be defined by one of followings:

notifying the base station to retransmit a whole TB;

notifying the base station to reckon a CBG to be retransmitted next time according to an appointed reckoning rule in combination with a CBG retransmitted at the current time; or notifying the base station of incorrect decoding of the CBG level HARQ-ACK last time.

Corresponding to the above-mentioned method, a method performing data transmission on the base station side includes steps described below.

The base station determines the CBG level HARQ-ACK bit according to the number of CBGs in last scheduling or the number of CBGs scheduled in the initial transmission, and receives the CBG level HARQ-ACK fed back by the UE.

The base station determines a CBG to be retransmitted according to the received CBG level HARQ-ACK and performs retransmission.

In an embodiment, when the base station receives the CBG level HARQ-ACK corresponding to the initially transmitted transmission block, the base station determines the CBG level HARQ-ACK bit according to the number of CBGs scheduled in the initial transmission and receives the CBG level HARQ-ACK fed back by the UE, after that, the base station determines a CBG to be retransmitted according to the received CBG level HARQ-ACK and performs retransmission.

In an embodiment, when the base station receives the CBG level HARQ-ACK fed back by the UE, the first indication information may also be received, at this time, the base station determines the CBG to be retransmitted according to the CBG level HARQ-ACK and first indication information fed back by the UE and performs retransmission.

For example, if the first indication information has the meaning of notifying the base station to retransmit the whole TB, the base station retransmits the whole TB according to the first indication information, the retransmission includes retransmission of the whole TB for once, or dividing the whole TB into multiple parts and retransmission of the multiple parts through multiple times.

For example, if the first indication information has the meaning of notifying the base station to reckon the CBG to be retransmitted next time according to the appointed reckoning rule in combination with the CBG retransmitted current time, the base station determines all CBGs in the TB except CBG(s) correctly transmitted in current transmission and performs the retransmission of all determined CBGs.

For example, when the first indication information has the meaning of notifying the base station of the incorrect decoding of the CBG level HARQ-ACK last time, the base station retransmits the whole TB.

The present embodiment further discloses a data acknowledgement information generation and feedback device, the device may be located at the UE side. The device at least includes following two units, an acknowledgement information generation unit and an acknowledgement information feedback unit.

The acknowledgement information generation unit is configured to, when a CBG scheduled and retransmitted by a base station through DCI is received, if it is determined that a CBG indication in the DCI is inconsistent with a CBG level HARQ-ACK fed back by the UE to the base station, determine a CBG level HARQ-ACK bit according to a set rule, and generate a CBG level HARQ-ACK.

In addition, if the CBG indication in the DCI is consistent with the CBG level HARQ-ACK fed back by the UE to the base station, the acknowledgement information generation unit at this time is configured to determine a number of bits of a CBG level HARQ-ACK according to the number of scheduled CBGs, and generate the CBG level HARQ-ACK.

Where, the CBG indication in the DCI is inconsistent with the CBG level HARQ-ACK fed back by the UE to the base station includes one of:

only at least one NACK is mistaken as an ACK by the base station side;

at least one ACK is mistaken as an NACK by the base station side; or at least one NACK is mistaken as an ACK by the base station side.

The CBG indication in the DCI is consistent with the CBG level HARQ-ACK fed back by the UE to the base station includes one of:

all NACKs or ACKs are correctly decoded by the base station side; or all NACKs are correctly decoded by the base station side; only at least one ACK is mistaken by the base station side as an NACK.

The acknowledgement information feedback unit is configured to feedback the generated CBG level HARQ-ACK to the base station.

In the present embodiment, there are multiple manners for the acknowledgement information generation unit to determine the CBG level HARQ-ACK bit according to the set rule and generate the CBG level HARQ-ACK.

For example, the acknowledgement information generation unit determines the CBG level HARQ-ACK bit according to the number of actually scheduled CBGs, generates the CBG level HARQ-ACK and adds the first indication information (indication A for short), and the acknowledgement information feedback unit feeds back the CBG level HARQ-ACK and the indication A simultaneously to the base station. At this time, the indication A may include one of following meanings:

notifying the base station to retransmit a whole TB;

notifying the base station to reckon a CBG to be retransmitted next time according to an appointed reckoning rule in combination with a CBG retransmitted current time; or notifying the base station of incorrect decoding of the CBG level HARQ-ACK last time.

For another example, the UE determines the CBG level HARQ-ACK bit according to the number of configured CBGs or the number of CBGs in last transmission, generates the CBG level HARQ-ACK and feeds back the generated CBG level HARQ-ACK to the base station.

The present embodiment further discloses a data acknowledgement information receiving device, the device may be located at the base station side. The device at least includes following units, an acknowledgement information acquisition unit and a transmitting unit.

The acknowledgement information acquisition unit is configured to determine a CBG level HARQ-ACK bit according to a set rule, receive a CBG level HARQ-ACK bit fed back by UE, and determine a CBG to be retransmitted; and the transmitting unit is configured to perform retransmission of the determined CBG to be retransmitted.

In an embodiment, the acknowledgement information acquisition unit may receive the CBG level HARQ-ACK and the added first indication information (indication A for short) fed back by UE; the transmitting unit at this time determines the CBG to be retransmitted according to the CBG level HARQ-ACK and indication A and performs retransmission.

Where, if the indication A has the meaning of notifying the base station to retransmit the whole TB, the acknowledgement information acquisition unit determines the whole TB as to be retransmitted according to the indication A. By this time, the transmitting unit retransmits the whole TB again, the retransmission includes retransmission of the whole TB for once, or dividing the whole TB into multiple parts and retransmission of the multiple parts through multiple times;

if the indication A has the meaning of notifying the base station to reckon the CBG to be retransmitted next time according to the appointed reckoning rule in combination with the CBG retransmitted current time, the acknowledgement information acquisition unit determines all CBGs in the TB except a CBG that has been correctly transmitted in current transmission as CBGs to be retransmitted;

if the indication A has the meaning of notifying the base station of the incorrect decoding of the CBG level HARQ-ACK last time, the acknowledgement information acquisition unit determines the whole TB as to be retransmitted according to the indication A.

Besides, the acknowledgement information acquisition unit in the above device may include a first detection module and an acquisition module, the first detection module is configured to receive and detect the CBG level HARQ-ACK fed back by the UE according to the number of CBGs actually scheduled; when the first detection module succeeds in receiving and detecting the CBG level HARQ-ACK fed back by the UE according to the number of CBGs actually scheduled, the acquisition module is configured to determine the CBG level HARQ-ACK received last time as correct, and determine a CBG fed back with an NACK as a CBG to be retransmitted according to the CBG level HARQ-ACK fed back by the UE at the current time.

In an embodiment, the acknowledgement information acquisition unit may further include a second detection module, when the first detection module fails in receiving and detecting the CBG level HARQ-ACK fed back by the UE according to the number of CBGs actually scheduled, the second detection module may receive and detect the CBG level HARQ-ACK fed back by the UE according to the number of configured CBGs or the number of CBGs in last transmission.

The present embodiment further discloses a data acknowledgement information generation and feedback device, the device may located at the UE side and include an acknowledgement information generation unit and an acknowledgement information feedback unit.

The acknowledgement information generation unit is configured to determine a CBG level HARQ-ACK bit according to a number of CBGs scheduled in last transmission or according to a number of CBGs scheduled in initial transmission, and generate a CBG level HARQ-ACK.

In an embodiment, for an initially transmitted transmission block, when the CBG level HARQ-ACK is fed back, the acknowledgement information generation unit may determine the CBG level HARQ-ACK bit according to the number of CBGs scheduled for the transmission block in initial transmission and generate the CBG level HARQ-ACK. The acknowledgement information feedback unit is configured to transmit the generated CBG level HARQ-ACK to the base station.

In an embodiment, when the CBG level HARQ-ACK is generated, the acknowledgement information generation unit may further add first indication information; at this moment, the acknowledgement information feedback unit feeds back the CBG level HARQ-ACK and the first indication information to the base station at the same time.

Where, the first indication information may have any one meaning of:

notifying the base station to retransmit a whole TB;

notifying the base station to reckon a CBG to be retransmitted next time according to an appointed reckoning rule in combination with a CBG retransmitted current time; or notifying the base station of incorrect decoding of the CBG level HARQ-ACK last time.

The present embodiment further discloses a data acknowledgement information receiving device, the device may be located at the base station side and includes an acknowledgement information acquisition unit and a transmitting unit.

The acknowledgement information acquisition unit is configured to determine a CBG level HARQ-ACK bit according to a number of CBGs scheduled in last scheduling or a number of CBGs scheduled in initial transmission, receive a CBG level HARQ-ACK fed back by the UE and determine a CBG to be retransmitted.

In an embodiment, when a CBG level HARQ-ACK corresponding to an initially transmitted transmission block is received, the acknowledgement information acquisition unit may determine the CBG level HARQ-ACK bit according to the number of CBGs scheduled in the initial transmission of the transmission block and receive the CBG level HARQ-ACK fed back by the UE.

The transmitting unit is configured to retransmit the determined CBG to be retransmitted.

In an embodiment, the acknowledgement information acquisition unit may further include a first module and a second module.

The first module is configured to receive the CBG level HARQ-ACK fed back by the UE, and also the first indication information.

The second module is configured to determine a whole TB as to be retransmitted according to the first indication information, when the first module has further received the first indication information and the first indication information has the meaning of notifying the base station to retransmit the whole TB;

when the first module has further received the first indication information, and the first indication information has the meaning of notifying the base station to reckon a CBG to be retransmitted next time according to an appointed reckoning rule in combination with a CBG retransmitted current time, the second module is configured to determine all CBGs in the TB except a CBG that has been correctly transmitted in current transmission according to the CBG level HARQ-ACK fed back by the UE as CBGs to be retransmitted; and when the first module has further received the first indication information, and the first indication information has the meaning of notifying the base station of the incorrect decoding of the CBG level HARQ-ACK last time, the second module is configured to determine the whole TB as to be retransmitted.

Figure 2:
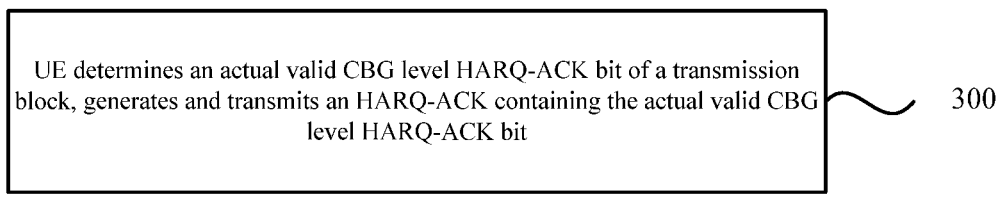
FIG. 2 is a flowchart of another data acknowledgement information generation and feedback method according to an embodiment of the present disclosure.

In an embodiment, as shown in FIG. 2, the present disclosure provides a data acknowledgement information generation and feedback method, the method includes a step described below.

In step 300, for a transmission block, UE determines an actual valid CBG level HARQ-ACK bit of the transmission block according to a number of CBGs actually scheduled in last transmission of the transmission block or according to a number of CBGs actually scheduled in initial transmission of the transmission block, generates and transmits an HARQ-ACK containing the actual valid CBG level HARQ-ACK bit.

In an embodiment, the step in which the UE determines the actual valid CBG level HARQ-ACK bit of the transmission block according to the number of CBGs actually scheduled in the initial transmission of the transmission block includes a step described below.

When the transmission block is initially transmitted or retransmitted, the UE determines the actual valid CBG level HARQ-ACK bit of the transmission block according to the number of CBGs actually scheduled in the initial transmission of the transmission block;

where, the retransmission of the transmission block includes retransmission of part or all CBGs of the transmission block; the retransmission of the transmission block further includes performing at least one retransmission of the transmission block.

In an embodiment, the step in which when the transmission block is initially transmitted or retransmitted, the UE determines the actual valid CBG level HARQ-ACK bit of the transmission block according to the number of CBGs actually scheduled in the initial transmission of the transmission block includes a step described below.

When the transmission block is initially transmitted or retransmitted, the UE determines a number of the actual valid CBG level HARQ-ACK bit of the transmission block to be equal to the number of CBGs actually scheduled in the initial transmission of the transmission block;

where, the number of CBGs actually scheduled in the initial transmission of the transmission block is determined according to a number of CBs contained in the transmission block and a number of configured CBGs.

In an embodiment, the number of CBGs actually scheduled in the initial transmission of the transmission block includes: when the number of configured CBGs is greater than the number of CBs contained in the transmission block, the number of CBGs actually scheduled for transmission by the transmission block is the number of CBs contained in the transmission block.

In an embodiment, the step in which the actual valid CBG level HARQ-ACK bit of the transmission block is determined further includes a step described below: a value of the actual valid CBG level HARQ-ACK bit is determined by at least one of:

when the UE performs an HARQ-ACK feedback on the retransmission of the transmission block, an ACK is fed back for a previously correctly received CBG;

when the UE performing the HARQ-ACK feedback on the retransmission of the transmission block, an NACK is fed back for a CBG to be retransmitted, which is not retransmitted current time; or when the UE performs the HARQ-ACK feedback on the retransmission of the transmission block, a feedback for a CBG to be retransmitted that has been retransmitted current time is determined as an ACK or NACK according to a decoding result of the CBG;

where the CBG to be retransmitted includes a CBG that is not correctly received by the UE previously, or a CBG that is previously fed back with an NACK by the UE; the previously correctly received CBG includes a CBG that has been correctly received previously and is retransmitted current time, or a CBG that has been correctly received previously and does not continue to be retransmitted current time.

In an embodiment, a CB contained in each CBG of the retransmitted transmission block is identical with a CB contained in the each CBG in the initial transmission of the transmission block.

In an embodiment, for retransmission of the transmission block, the UE corresponds each of the CBGs actually scheduled in the initial transmission to one HARQ-ACK bit according to the CBGs actually scheduled in the initial transmission of the transmission block.

In an embodiment, when the UE generates the HARQ-ACK containing the actual valid CBG level HARQ-ACK bit, first indication information is added, and the HARQ-ACK containing the actual valid CBG level HARQ-ACK bit and first indication information are fed back to the base station simultaneously, where the first indication information includes one of:

notifying the base station to retransmit the whole transmission block;

notifying the base station to reckon a CBG to be retransmitted next time according to an appointed reckoning rule in combination with a CBG retransmitted current time; or notifying the base station of incorrect decoding of the HARQ-ACK containing the actual valid CBG level HARQ-ACK bit last time.

Figure 3:
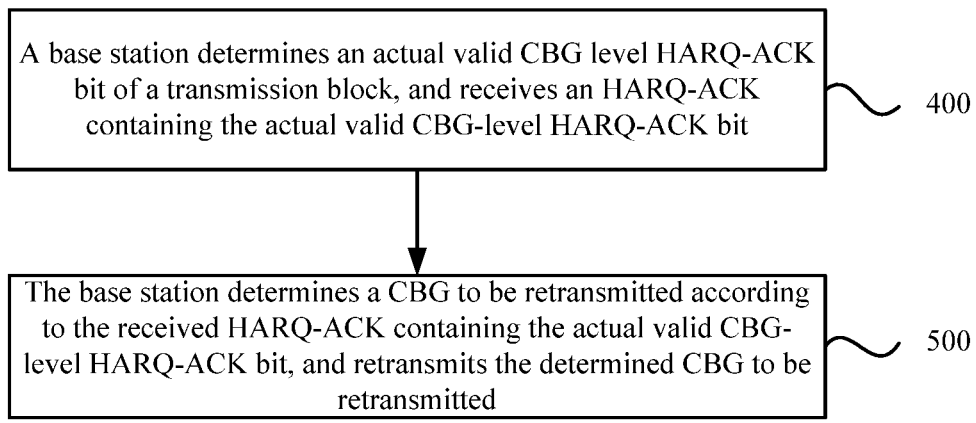
FIG. 3 is a flowchart of a data acknowledgement information receiving method according to an embodiment of the present disclosure.

In an embodiment, as shown in FIG. 3, the present disclosure further provides a data acknowledgement information receiving method, the method includes steps described below.

In step 400, for a transmission block, a base station determines an actual valid CBG level HARQ-ACK bit of the transmission block according to a number of CBGs actually scheduled in last transmission of the transmission block or a number of CBGs actually scheduled in initial transmission of the transmission block, and receives an HARQ-ACK containing the actual valid CBG-level HARQ-ACK bit of the transmission block.

In step 500, the base station determines a CBG to be retransmitted according to the received HARQ-ACK containing the actual valid CBG-level HARQ-ACK bit, and retransmits the determined CBG to be retransmitted.

In an embodiment, the step in which the base station determines the actual valid CBG level HARQ-ACK bit of the transmission block according to the number of CBGs actually scheduled in the initial transmission of the transmission block includes a step described below.

When the transmission block is initially transmitted or retransmitted, the base station determines an actual valid CBG level HARQ-ACK bit of the transmission block according to the number of CBGs actually scheduled in the initial transmission of the transmission block;

where, the retransmission of the transmission block includes retransmission of partial or all CBGs of the transmission block; the retransmission of the transmission block further includes performing at least one retransmission of the transmission block.

In an embodiment, the step in which when the transmission block is initially transmitted or retransmitted, the base station determines the actual valid CBG level HARQ-ACK bit of the transmission block according to the number of CBGs actually scheduled in the initial transmission of the transmission block includes a step described below.

When the transmission block is initially transmitted or retransmitted, the base station determines a number of the actual valid CBG level HARQ-ACK bit of the transmission block to be equal to the number of CBGs actually scheduled in the initial transmission of the transmission block;

where, the number of CBGs actually scheduled in the initial transmission of the transmission block is determined according to a number of CBs contained in the transmission block and a number of configured CBGs.

In an embodiment, the number of CBGs actually scheduled in the initial transmission of the transmission block includes: when the number of configured CBGs is greater than the number of CBs contained in the transmission block, the number of CBGs actually scheduled for transmission of the transmission block is the number of CBs contained in the transmission block.

In an embodiment, the step in which the base station determines the CBG to be retransmitted according to the received HARQ-ACK containing the actual valid CBG-level HARQ-ACK bit includes a step described below.

The base station determines the CBG to be retransmitted according to HARQ-ACK information fed back current time by the UE.

In an embodiment, for retransmission of the transmission block, the base station verifies that the UE corresponds each of the CBGs actually scheduled in the initial transmission of the transmission block to one HARQ-ACK bit according to the CBGs actually scheduled in the initial transmission of the transmission block.

In an embodiment, a CB contained in each CBG of the retransmitted transmission block is identical with a CB contained in the each CBG in the initial transmission of the transmission block.

In an embodiment, when the base station receives the HARQ-ACK containing the actual valid CBG level HARQ-ACK bit, and further receives first indication information, the base station determines a CBG to be retransmitted according to the HARQ-ACK and first indication information fed back by the UE; where, when the first indication information includes notifying the base station to retransmit the whole transmission block, the base station retransmits the transmission block, retransmission of the transmission block includes retransmission of the whole transmission block for once, or dividing the whole transmission block into multiple parts and retransmission of the multiple parts through multiple times;

when the first indication information includes notifying the base station to reckon a CBG to be retransmitted next time according to an appointed reckoning rule in combination with a CBG retransmitted current time, the base station determines all CBGs in the TB except a CBG that has been correctly transmitted in current transmission according to the HARQ-ACK containing the actual valid CBG level HARQ-ACK bit fed back by the UE at the current time, and retransmits the determined CBGs; and when the first indication information includes notifying the base station of the incorrect decoding of the HARQ-ACK containing the actual valid CBG level HARQ-ACK bit last time, the base station retransmits the whole transmission block.

Figure 4:
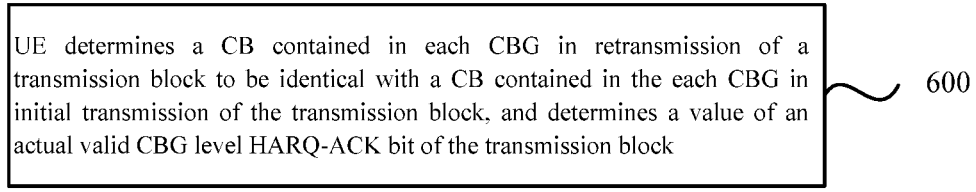
FIG. 4 is a flowchart of another data acknowledgement information generation and feedback method according to an embodiment of the present disclosure.

In an embodiment, as shown in FIG. 4, the present disclosure provides a data acknowledgement information generation and feedback method, the method includes a step described below.

In step 600, for a transmission block, UE determines a CB contained in each CBG in retransmission of the transmission block to be identical with a CB contained in the each CBG in initial transmission of the transmission block, and determines a value of an actual valid CBG level HARQ-ACK bit of the transmission block according to at least one of:

when the UE performs an HARQ-ACK feedback on the retransmission of the transmission block, an ACK is fed back for a previously correctly received CBG;

when the UE performs the HARQ-ACK feedback on the retransmission of the transmission block, an NACK is fed back for a CBG to be retransmitted that is not retransmitted current time; or when the UE performs the HARQ-ACK feedback on the retransmission of the transmission block, a feedback of a CBG to be retransmitted that has been retransmitted current time is determined as an ACK or NACK according to a decoding result of the CBG;

where, the CBG to be retransmitted includes a CBG that is not correctly received by the UE previously or a CBG that is previously fed back with an NACK by the UE. The previously correctly received CBG includes a previously correctly received CBG, which is retransmitted again by current time, or a previously correctly received CBG, which does not continue to be transmitted again in current transmission.

In an embodiment, the step in which the actual valid CBG level HARQ-ACK bit of the transmission block is determined includes a step described below.

When the transmission block is initially transmitted or retransmitted, the UE determines the actual valid CBG level HARQ-ACK bit of the transmission block according to the number of CBGs actually scheduled in the initial transmission of the transmission block;

where, the retransmission of the transmission block includes retransmission of partial or all CBGs of the transmission block; the retransmission of the transmission block further includes performing at least one retransmission of the transmission block.

In an embodiment, the step in which when the transmission block is initially transmitted or retransmitted, the UE determines the actual valid CBG level HARQ-ACK bit of the transmission block according to the number of CBGs actually scheduled in the initial transmission of the transmission block includes a step described below.

When the transmission block is initially transmitted or retransmitted, the UE determines a number of the actual valid CBG level HARQ-ACK bit of the transmission block to be equal to the number of CBGs actually scheduled in the initial transmission of the transmission block;

where, the number of CBGs actually scheduled in the initial transmission of the transmission block is determined according to a number of CBs contained in the transmission block and a number of configured CBGs.

In an embodiment, the number of CBGs actually scheduled in the initial transmission of the transmission block includes that when the number of configured CBGs is greater than the number of CBs contained in the transmission block, the number of CBGs actually scheduled for transmission by the transmission block is the number of CBs contained in the transmission block.

In an embodiment, for retransmission of the transmission block, the UE corresponds each of the CBGs actually scheduled in the initial transmission to one HARQ-ACK bit according to the CBGs actually scheduled in the initial transmission of the transmission block.

Figure 5:
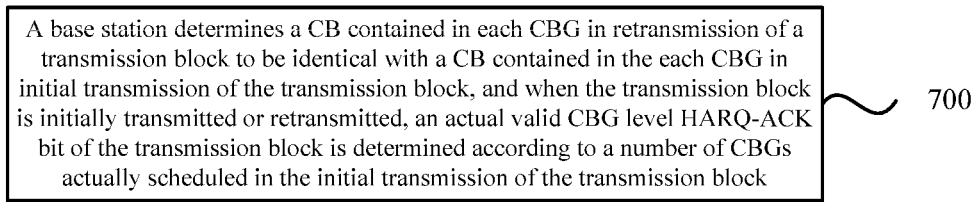
FIG. 5 is a flowchart of another data acknowledgement information receiving method according to an embodiment of the present disclosure.

In an embodiment, as shown in FIG. 5, the present disclosure further provides a data acknowledgement information receiving method, the method includes a step described below.

In step 700, for a transmission block, a base station determines a CB contained in each CBG in retransmission of the transmission block to be identical with a CB contained in the each CBG in initial transmission of the transmission block, and for the initial transmission or the retransmission of the transmission block, an actual valid CBG level HARQ-ACK bit of the transmission block is determined according to a number of CBGs actually scheduled in the initial transmission of the transmission block;

where, the retransmission of the transmission block includes retransmission of partial or all CBGs of the transmission block; the retransmission of the transmission block further includes performing at least one retransmission of the transmission block.

In an embodiment, the step in which the actual valid CBG level HARQ-ACK bit of the transmission block is determined according to the number of CBGs actually scheduled in the initial transmission of the transmission block includes a step described below.

When the transmission block is initially transmitted or retransmitted, the base station determines a number of the actual valid CBG level HARQ-ACK bit of the transmission block equal to the number of CBGs actually scheduled in the initial transmission of the transmission block;

where, the number of CBGs actually scheduled in the initial transmission of the transmission block is determined according to a number of CBs contained in the transmission block and a number of configured CBGs.

In an embodiment, the number of CBGs actually scheduled in the initial transmission of the transmission block includes that when the number of configured CBGs is greater than the number of CBs contained in the transmission block, the number of CBGs actually scheduled for transmission by the transmission block is the number of CBs contained in the transmission block.

In an embodiment, when the transmission block is initially transmitted or retransmitted, the base station verifies that the UE corresponds each of the CBGs actually scheduled in the initial transmission of the transmission block to one HARQ-ACK bit according to the CBGs actually scheduled in the initial transmission of the transmission block.

Figure 6:
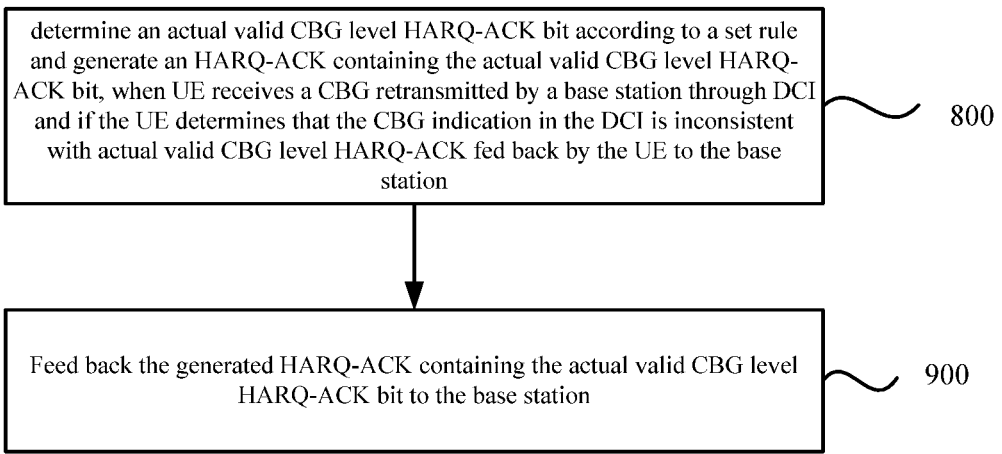
FIG. 6 is a flowchart of another data acknowledgement information generation and feedback method according to an embodiment of the present disclosure.

In an embodiment, as shown in FIG. 6, the present disclosure further provides a data acknowledgement information generation and feedback method, the method includes steps described below.

In step 800, when UE receives a CBG retransmitted by a base station through DCI, and if the UE determines that a CBG indication in the DCI is inconsistent with an actual valid CBG level HARQ-ACK fed back by the UE to the base station, the UE determines an actual valid CBG level HARQ-ACK bit according to a set rule, and generates an HARQ-ACK containing the actual valid CBG level HARQ-ACK bit; and in step 900, the generated HARQ-ACK containing the actual valid CBG level HARQ-ACK bit is fed back to the base station.

In an embodiment, if the UE determines that the CBG indication in the DCI is consistent with the actual valid CBG level HARQ-ACK fed back by the UE to the base station, the UE determines the actual valid CBG level HARQ-ACK bit according to a number of CBGs actually scheduled for transmission, and generates the HARQ-ACK containing the actual valid CBG level HARQ-ACK bit.

In an embodiment, the UE determines the CBG indication in the DCI inconsistent with the actual valid CBG level HARQ-ACK fed back by the UE to the base station includes one of:

at least one NACK is misunderstood as an ACK; or at least one ACK is misunderstood as an NACK.

In an embodiment, the step in which the UE determines that CBG indication in the DCI is inconsistent with actual valid CBG level HARQ-ACK fed back by the UE to the base station, the actual valid CBG level HARQ-ACK bit is determined according to the set rule, the HARQ-ACK containing the actual valid CBG level HARQ-ACK bit is generated, and the generated HARQ-ACK containing the actual valid CBG level HARQ-ACK bit is fed back to the base station include one of following described cases.

The UE determines the actual valid CBG level HARQ-ACK bit according to the number of CBGs actually scheduled for transmission, generates the HARQ-ACK containing the actual valid CBG level HARQ-ACK bit, adds first indication information, and feeds back the HARQ-ACK containing the actual valid CBG level HARQ-ACK bit and the first indication information simultaneously to the base station;

the UE determines the actual valid CBG level HARQ-ACK bit according to a number of pre-configured CBGs, generates the HARQ-ACK containing the actual valid CBG level HARQ-ACK bit, and feeds back the generated HARQ-ACK containing the actual valid CBG level HARQ-ACK bit to the base station; or the UE determines the actual valid CBG level HARQ-ACK bit according to the number of CBGs actually scheduled in last transmission of the base station, generates the HARQ-ACK containing the actual valid CBG level HARQ-ACK bit, and feeds back the generated HARQ-ACK containing the actual valid CBG level HARQ-ACK bit to the base station.

In an embodiment, the first indication information includes one of followings:

notifying the base station to retransmit the whole transmission block;

notifying the base station to reckon a CBG to be retransmitted next time according to an appointed reckoning rule in combination with a CBG retransmitted current time; or notifying the base station of incorrect decoding of the HARQ-ACK containing the actual valid CBG level HARQ-ACK bit last time.

Figure 7:
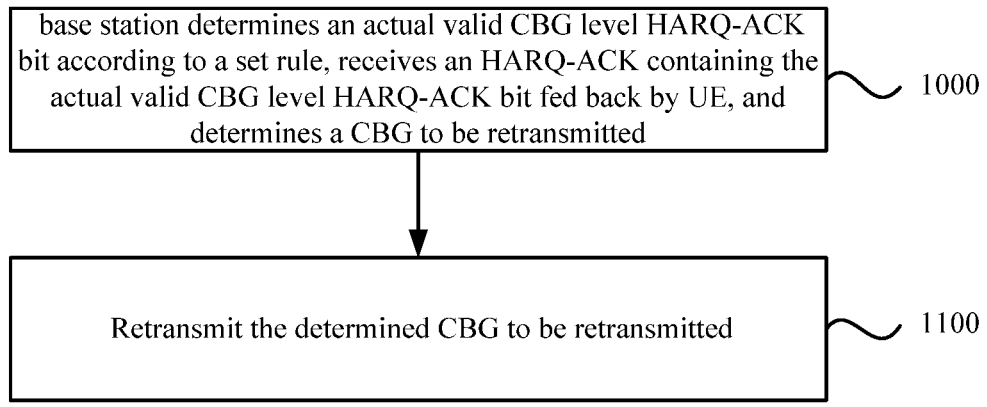
FIG. 7 is a flowchart of another data acknowledgement information receiving method according to an embodiment of the present disclosure.

In an embodiment, as shown in FIG. 7, the present disclosure further provides a data acknowledgement information receiving method, the method includes steps described below.

In step 1000, a base station determines an actual valid CBG level HARQ-ACK bit according to a set rule, receives an HARQ-ACK containing the actual valid CBG level HARQ-ACK bit fed back by UE, and determines a CBG to be retransmitted; and in step 1100, the determined CBG to be retransmitted is retransmitted.

In an embodiment, the step in which the base station determines the actual valid CBG level HARQ-ACK bit according to the set rule, receives the HARQ-ACK containing the actual valid CBG level HARQ-ACK bit fed back by the UE, determines the CBG to be retransmitted and the determined CBG to be retransmitted is retransmitted include steps described below.

The base station determines the actual valid CBG level HARQ-ACK bit according to a number of CBGs actually scheduled for transmission, and receives the HARQ-ACK containing the actual valid CBG level HARQ-ACK bit and first indication information; where, when the first indication information includes notifying the base station to retransmit a whole TB, the base station retransmits the whole TB according to the first indication information, where, retransmission of the whole TB includes retransmission of the whole TB for once, or dividing the whole TB into multiple parts and retransmission the multiple parts through multiple times;

when the first indication information includes notifying the base station to reckon a CBG to be retransmitted next time according to an appointed reckoning rule in combination with a CBG retransmitted current time, the base station determines all CBGs in the transmission block except a CBG that has been correctly transmitted current time according to the actual valid CBG-level HARQ-ACK bit information fed back by the UE, and all determined CBGs are retransmitted; or when the first indication information includes notifying the base station of incorrect decoding of an HARQ-ACK containing the actual valid CBG level HARQ-ACK bit last time, the base station determines the whole TB according to the first indication information.

In an embodiment, the step in which the base station determines the actual valid CBG level HARQ-ACK bit according to the set rule, receives the HARQ-ACK containing the actual valid CBG level HARQ-ACK bit fed back by UE, determines the CBG to be retransmitted and the determined CBG to be retransmitted is retransmitted include steps described below.

The base station receives and detects the HARQ-ACK containing the actual valid CBG-level HARQ-ACK bit fed back by the UE according to the number of CBGs actually scheduled for transmission;

when there is a success in detecting the HARQ-ACK containing the actual valid CBG-level HARQ-ACK bit fed back current time by the UE according to the number of CBGs actually scheduled for transmission, the base station verifies the HARQ-ACK containing the actual valid CBG-level HARQ-ACK bit received last time as correct, and determines a CBG fed back with an NACK according to the HARQ-ACK containing the actual valid CBG-level HARQ-ACK bit fed back current time by the UE, and retransmits the CBG fed back with an NACK.

In an embodiment, when there is a failure in detecting the HARQ-ACK containing the actual valid CBG-level HARQ-ACK bit fed back current time by the UE according to the number of CBGs actually scheduled for transmission, the HARQ-ACK containing the actual valid CBG-level HARQ-ACK bit fed back by the UE is detected according to a number of pre-configured CBGs; and when there is a success in detecting the HARQ-ACK containing the actual valid CBG-level HARQ-ACK bit fed back current time by the UE according to the number of the pre-configured CBGs, the base station determines the HARQ-ACK containing the actual valid CBG-level HARQ-ACK bit received last time as incorrect, and retransmits, according to the HARQ-ACK containing the actual valid CBG-level HARQ-ACK bit fed back current time by the UE, a CBG fed back with an NACK.

In an embodiment, when there is a failure in detecting the HARQ-ACK containing the actual valid CBG-level HARQ-ACK bit fed back current time by the UE according to the number of CBGs actually scheduled for transmission, the HARQ-ACK containing the actual valid CBG-level HARQ-ACK bit fed back current time by the UE is detected according to a number of CBGs in last scheduling;

when there is a success in detecting the HARQ-ACK containing the actual valid CBG-level HARQ-ACK bit fed back current time by the UE according to the number of CBGs in last scheduling, the base station determines the HARQ-ACK containing the actual valid CBG-level HARQ-ACK bit received last time as incorrect, and retransmits, according to the HARQ-ACK containing the actual valid CBG-level HARQ-ACK bit fed back current time by the UE, a CBG fed back with an NACK.

Figure 8:
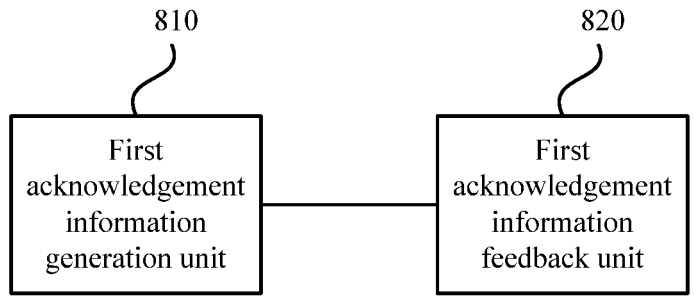
FIG. 8 is a structural diagram of a data acknowledgement information generation and feedback device according to an embodiment of the present disclosure.

In an embodiment, as shown in FIG. 8, the present disclosure further provides a data acknowledgement information generation and feedback device, the device includes a first acknowledgement information generation unit 810 and a first acknowledgement information feedback unit 820.

The first acknowledgement information generation unit 810 is configured to determine an actual valid CBG level HARQ-ACK bit of a transmission block according to a number of CBGs actually scheduled in last transmission of the transmission block or according to a number of CBGs actually scheduled in initial transmission of the transmission block, and generate an HARQ-ACK containing the actual valid CBG level HARQ-ACK bit;

the first acknowledgement information feedback unit 820 is configured to transmit the generated HARQ-ACK containing the actual valid CBG level HARQ-ACK bit.

In an embodiment, the first acknowledgement information generation unit 810 is configured to determine the actual valid CBG level HARQ-ACK bit of the transmission block according to the number of CBGs actually scheduled in the initial transmission of the transmission block, when the transmission block is initially transmitted or retransmitted;

where, the retransmission of the transmission block includes retransmission of part or all CBGs of the transmission block; the retransmission of the transmission block further includes performing at least one retransmission of the transmission block.

Figure 9:
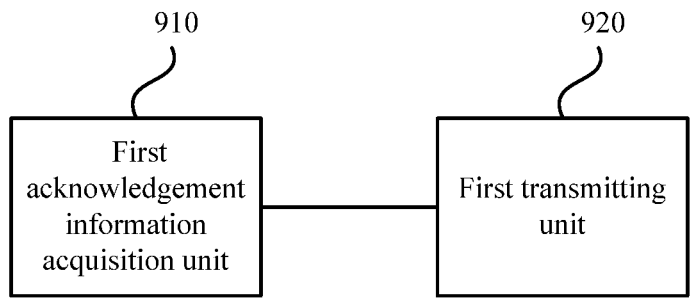
FIG. 9 is a structural diagram of a data acknowledgement information receiving device according to an embodiment of the present disclosure.

In an embodiment, as shown in FIG. 9, the present disclosure further provides a data acknowledgement information receiving device, the device includes a first acknowledgement information acquisition unit 910 and a first transmitting unit 920.

The first acknowledgement information acquisition unit 910 is configured to determine an actual valid CBG level HARQ-ACK bit of a transmission block according to a number of CBGs actually scheduled in last transmission of the transmission block or a number of CBGs actually scheduled in initial transmission of the transmission block, and receive an HARQ-ACK containing the actual valid CBG level HARQ-ACK bit of the transmission block; and the first transmitting unit 920 is configured to determine a CBG to be retransmitted according to the received HARQ-ACK containing the actual valid CBG level HARQ-ACK bit, and retransmit the determined CBG to be retransmitted.

In an embodiment, the first acknowledgement information acquisition unit 910 is configured to determine the actual valid CBG level HARQ-ACK bit of the transmission block according to the number of CBGs actually scheduled in the initial transmission of the transmission block, when the transmission block is initially transmitted or retransmitted, where, the retransmission of the transmission block includes retransmission of part or all CBGs of the transmission block; the retransmission of the transmission block further includes performing at least one retransmission of the transmission block.

Figure 10:
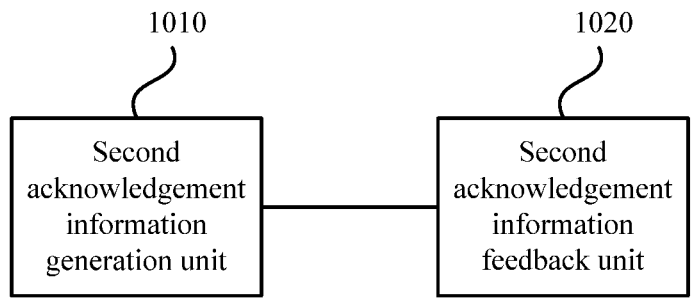
FIG. 10 is a structural diagram of another data acknowledgement information generation and feedback device according to an embodiment of the present disclosure.

In an embodiment, as shown in FIG. 10, the present disclosure further provides a data acknowledgement information generation and feedback device, the device includes a second acknowledgement information generation unit 1010 and a second acknowledgement information feedback unit 1020.

The second acknowledgement information generation unit 1010 is configured to determine a CB contained in each CBG in retransmission of a transmission block to be identical with a CB contained in the each CBG in initial transmission of the transmission block, and determine a value of an actual valid CBG level HARQ-ACK bit of the transmission block according to at least one of:

the second acknowledgement information feedback unit 1020 is configured to: when an HARQ-ACK feedback on the retransmission of the transmission block is performed, feed back an ACK for a previously correctly received CBG;

when the HARQ-ACK feedback on the retransmission of the transmission block is performed, feed back an NACK for a CBG to be retransmitted that is not retransmitted current time; or when the HARQ-ACK feedback on the retransmission of the transmission block is performed, determine a feedback for a CBG to be retransmitted that has been retransmitted current time as an ACK or NACK according to a decoding result of the CBG;

where, the CBG to be retransmitted includes a CBG that is not correctly received by the UE previously or a CBG that is previously fed back with an NACK by the UE. The previously correctly received CBG includes a previously correctly received CBG, which is retransmitted again retransmitted current time, or a previously correctly received CBG, which does not continue to be transmitted again in current transmission.

Figure 11:
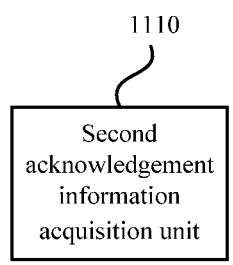
FIG. 11 is a structural diagram of another data acknowledgement information receiving device according to an embodiment of the present disclosure.

In an embodiment, as shown in FIG. 11, the present disclosure further provides a data acknowledgement information receiving device, the device includes a second acknowledgement information acquisition unit 1110.

The second acknowledgement information acquisition unit 1110 is configured to determine a CB contained in each CBG in retransmission of a transmission block to be identical with a CB contained in the each CBG in initial transmission of the transmission block, and when the transmission block is initially transmitted or retransmitted, to determine an actual valid CBG level HARQ-ACK bit of the transmission block according to a number of CBGs actually scheduled in the initial transmission of the transmission block;

where, the retransmission of the transmission block includes retransmission of partial or all CBGs of the transmission block; the retransmission of the transmission block further includes performing at least one retransmission of the transmission block.

Figure 12:
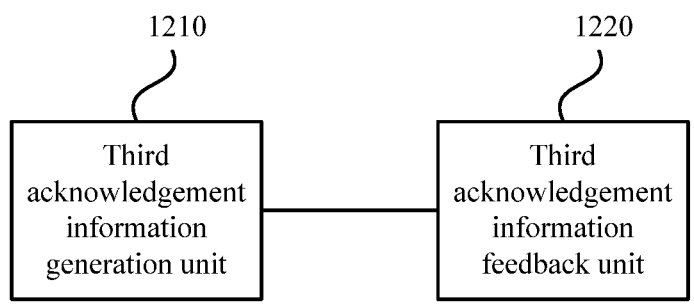
FIG. 12 is a structural diagram of another data acknowledgement information generation and feedback device according to an embodiment of the present disclosure.

In an embodiment, as shown in FIG. 12, the present disclosure further provides a data acknowledgement information generation and feedback device, the device includes a third acknowledgement information generation unit 1210 and a third acknowledgement information feedback unit 1220.

The third acknowledgement information generation unit 1210 is configured to: when a CBG retransmitted by a base station through DCI is received, if it is determined that a CBG indication in the DCI is inconsistent with an actual valid CBG level HARQ-ACK fed back by UE to the base station, determine an actual valid CBG level HARQ-ACK bit according to a set rule, and generate an HARQ-ACK containing the actual valid CBG level HARQ-ACK bit; and the third acknowledgement information feedback unit 1220 is configured to feedback the generated HARQ-ACK containing the actual valid CBG level HARQ-ACK bit to the base station.

In an embodiment, the third acknowledgement information generation unit 1210 is configured to:

determine the actual valid CBG level HARQ-ACK bit according to a number of CBGs actually scheduled for transmission, generate an HARQ-ACK containing the actual valid CBG level HARQ-ACK bit, and add first indication information; or determine the actual valid CBG level HARQ-ACK bit according to a number of pre-configured CBGs, and generate an HARQ-ACK containing the actual valid CBG level HARQ-ACK bit; or determine the actual valid CBG level HARQ-ACK bit according to a number of CBGs actually scheduled for last transmission by the base station, and generate an HARQ-ACK containing the actual valid CBG level HARQ-ACK bit;

where, the first indication information includes one of:

notifying the base station to retransmit the transmission block;

notifying the base station to reckon a CBG to be retransmitted next time according to an appointed reckoning rule in combination with a CBG retransmitted current time; or notifying the base station of incorrect decoding of the HARQ-ACK containing the actual valid CBG level HARQ-ACK bit last time.

Figure 13:
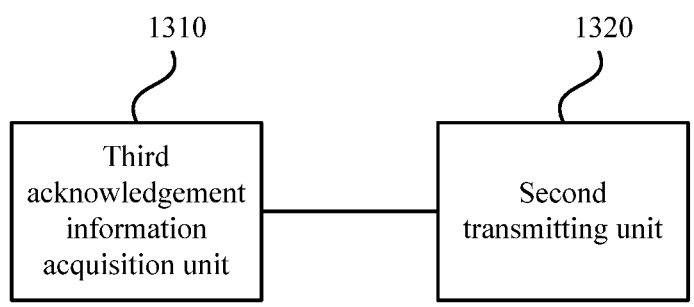
FIG. 13 is a structural diagram of another data acknowledgement information receiving device according to an embodiment of the present disclosure.

In an embodiment, as shown in FIG. 13, the present disclosure further provides a data acknowledgement information receiving device, the device includes a third acknowledgement information acquisition unit 1310 and a second transmitting unit 1320.

The third acknowledgement information acquisition unit 1310 is configured to determine an actual valid CBG level HARQ-ACK bit according to a set rule, receive an HARQ-ACK containing the actual valid CBG level HARQ-ACK bit fed back by UE and determine a CBG to be retransmitted; and the second transmitting unit 1320 is configured to retransmit the determined CBG to be retransmitted.

In an embodiment, the third acknowledgement information acquisition unit 1310 is configured to:

determine the actual valid CBG level HARQ-ACK bit according to a number of CBGs actually scheduled for transmission, and receive the HARQ-ACK containing the actual valid CBG level HARQ-ACK bit and first indication information; where when the first indication information includes notifying the base station to retransmit a whole TB, the whole TB is determined as to be retransmitted according to the first indication information;

when the first indication information includes notifying the base station to reckon a CBG for next transmission according to an appointed reckoning rule in combination with a CBG for current retransmission, all CBGs in the transmission block except a CBG that has been correctly transmitted current time are determined as CBGs to be retransmitted according to the actual valid CBG-level HARQ-ACK bit information fed back by the UE; or when the first indication information includes notifying the base station of incorrect decoding of the HARQ-ACK containing the actual valid CBG level HARQ-ACK bit last time, the whole TB is determined as to be retransmitted according to the first indication information.

In an embodiment, the present disclosure further provides UE, including a memory, a processor and a computer program stored on the memory and executable on the processor, when the processor executes the computer program, it implements any one of the above-mentioned data acknowledgement information generation and feedback methods or the above-mentioned data acknowledgement information receiving methods.

In an embodiment, the present disclosure further provides a base station, including a memory, a processor and a computer program stored on the memory and executable on the processor, when the processor executes the computer program, it implements any one of the above-mentioned data acknowledgement information generation and feedback methods or the above-mentioned data acknowledgement information receiving methods.

In an embodiment, the present disclosure further provides a computer storage medium, storing a computer program, when the computer program is executed by a processor, it performs any one of the above-mentioned data acknowledgement information generation and feedback methods or the above-mentioned data acknowledgement information receiving methods.

In the technical solutions of the present application, after the UE is configured with a CBG retransmission mechanism, a number of CBG level HARQ-ACK feedback bits can be reduced, the CBG retransmission mechanism will not be affected, and robustness of retransmission is increased. An implementation of the above solutions will be described in detail below in combination with embodiments in various application scenarios.

Example 1

This example proposes that a number of CBG level HARQ-ACK bits may be determined according to a number of actually transmitted CBGs, and the base station is notified to retransmit data in combination with indication A, based on which, a data acknowledgement information generation and feedback method is proposed, and the method includes steps described below.

Step 11, UE is configured to determine the number of CBG level HARQ-ACK bits according to the number of actually transmitted CBGs.

The operation in this step is optional, for example, when there is no such configuration, the method may also be implemented according to a following feedback, or for a retransmission feedback, other methods are processed identically.

Step S12: the UE determines the CBG level HARQ-ACK bits according to the number of actually transmitted CBGs (assuming each CBG corresponding to one bit), if there is at least one CBG in these CBGs that has not been correctly decoded by the UE, the UE forms a CBG level HARQ-ACK and transmits the CBG level HARQ-ACK to the base station.

Step S13, the base station receives a feedback from the UE. Then, according to the received CBG level HARQ-ACK, a CBG marked as an NACK is retransmitted.

In this step, the base station schedules a CBG to be retransmitted through DCI, and the DCI includes a CBG indication (the CBG indication is used to indicate which CBG is retransmitted).

Step S14, the UE receives a CBG retransmitted by the base station (or the UE receives a TB retransmitted by the base station), if the UE determines that the CBG indication in the DCI is inconsistent with the CBG level HARQ-ACK fed back by the UE to the base station, the base station and the UE have following behaviors:

the UE forms a CBG level HARQ-ACK bit according to the number of actually retransmitted CBGs and feeds back to the base station, meanwhile, the UE feeds back 1-bit HARQ-ACK indication (denoted as indication A) additionally, and the base station receives the CBG level HARQ-ACK bit for the retransmitted CBG and the indication A.

Where, the indication A has one of following meanings:

a) notifying the base station to retransmit a whole TB.

When the indication A has the meaning of a, the base station retransmits the whole TB again. In an embodiment, for once more retransmission, the base station may retransmit the whole TB for once; alternatively, the whole TB may be retransmitted for several times, but each time part of the TB is retransmitted. For example, the base station retransmits a part of data that has not been retransmitted in the whole TB before rest of the data is retransmitted.

b) notifying the base station to reckon a CBG to be retransmitted next time in combination with a CBG retransmitted current time, and a reckoning rule is appointed (seeing below for details).

When the indication A has the meaning of b, the reckoning rule appointed by the base station and the UE includes that: the base station determines all CBGs in the TB except a CBG that has been correctly transmitted (retransmitted) according to received CBG level HARQ-ACK information fed back current time by the UE. In other words, the CBG level HARQ-ACK feedback information received last time by the base station becomes invalid information, the CBG to be retransmitted is re-determined according to the CBG level HARQ-ACK information fed back current time by the UE.

c) notifying the base station of incorrect decoding of the CBG level HARQ-ACK last time.

When indicating A has the meaning of c, the base station retransmits the whole TB.

In addition, if the UE determines that the CBG indication in the DCI is consistent with the CBG level HARQ-ACK fed back by the UE to the base station (including an ACK misunderstood as an NACK or an NACK misunderstood as an ACK), the UE determines the number of the CBG level HARQ-ACK bits according to the number of actually scheduled CBGs.

Where, it is determined that the CBG indication in the DCI is inconsistent with the CBG level HARQ-ACK fed back by the UE to the base station includes that:

only when at least one NACK is misunderstood as an ACK, it is determined to be inconsistent;

alternatively, at least one ACK is misunderstood as an NACK, or at least one NACK is misunderstood as an ACK.

Where, it is determined that the CBG indication in the DCI is consistent with the CBG level HARQ-ACK fed back by the UE to the base station includes that:

all NACKs and ACKs are decoded correctly; or all NACKs are decoded correctly, and at least one ACK is misunderstood as an NACK.

It may be seen from the above descriptions, in this embodiment, the above indication A information may always be transmitted, so that the base station always performs reception and decoding of the HARQ-ACK according to the indication A added by the UE, which may avoid blind detection of a length of fed back HARQ-ACK bits. For example, the base station and the UE appoint that the UE determines the number of CBG level HARQ-ACK bits to be fed back according to the number of actually scheduled CBGs, and feeds back the indication A simultaneously. At this moment, the indication A may indicate different cases by setting as 0 or 1, for example, setting as 1 indicates that the base station has not correctly decoded the HARQ-ACK fed back last time by the UE, while setting as 0 indicates that the base station has correctly decoded the HARQ-ACK fed back last time by the UE. For another example, setting as 1 indicates that the base station will reckon a CBG to be retransmitted according to the HARQ-ACK fed back current time (i.e. there is a decoding error in the HARQ-ACK received last time), and setting as 0 indicates that the base station does not need to reckon the CBG to be retransmitted according to the HARQ-ACK fed back current time (i.e. the HARQ-ACK received last time has not been misunderstood).

Example Two

This example proposes that the number of CBG level HARQ-ACK bits may be determined according to a number of pre-configured CBGs, to notify the base station to retransmit the data, based on which, a data acknowledgement information generation and feedback method is proposed, the method includes steps described below.

Step 21, the UE is configured to determine the number of CBG level HARQ-ACK bits according to the number of actually transmitted CBGs.

Where, the operation in this step is optional, for example, when there is no such operation, the method may also be implemented according to a following feedback, or for a retransmission feedback, other methods are processed identically.

Step 22: the UE determines the CBG level HARQ-ACK bits according to the number of actually transmitted CBGs (assuming each CBG corresponding to one bit), if there is at least one CBG in these CBGs that has not been correctly decoded by the UE, the UE forms a CBG level HARQ-ACK and transmits to the base station.

Step 23, the base station receives a feedback of the UE. Then, according to the received CBG level HARQ-ACK, a CBG marked as an NACK is retransmitted.

Where, the base station schedules a CBG to be retransmitted through DCI, and the DCI includes a CBG indication (the CBG indication is used to indicate which CBG is retransmitted).

Step 24, the UE receives a CBG retransmitted by the base station (or the UE receives a TB retransmitted by the base station), if the UE determines that the CBG indication in the DCI is inconsistent with the CBG level HARQ-ACK fed back by the UE to the base station (which may include an ACK being misunderstanding as an NACK or an NACK being misunderstanding as an ACK), the base station and the UE have following behaviors:

A) the UE forms a CBG level HARQ-ACK bit according to the number of configured CBGs and feeds back the CBG level HARQ-ACK bit.

B) since the base station side does not know the number of CBG level HARQ-ACK bits fed back by the UE, the base station side needs to detect (also called as blind detection) according to two cases respectively, such as, in the first case, the base station receives and detects the CBG level HARQ-ACK fed back by the UE according to the number of actually transmitted CBGs; and in the second case, the base station receives and detects the CBG level HARQ-ACK fed back by the UE according to the number of configured CBGs. If one of the above cases is successful, there is no need to implement the other.

If the base station successfully detects the CBG level HARQ-ACK in current feedback according to the first case, the base station considers the CBG level HARQ-ACK received last time as correct. If the base station successfully detects the CBG level HARQ-ACK fed back current time according to the second case, the base station considers that decoding of the CBG level HARQ-ACK received last time as incorrect.

C) the base station determines a CBG to be retransmitted according to the CBG level HARQ-ACK fed back current time by the UE. Especially for the second case, the base station retransmits a CBG fed back with an NACK according to the received CBG level HARQ-ACK.

It is considered that a false probability of the CBG level HARQ-ACK received by the base station is small, the base station preferentially performs the detection according to the first case, which may reduce detection complexity of the base station.

In addition, if the UE determines that the CBG indication in the DCI is consistent with the CBG level HARQ-ACK fed back by the UE to the base station (including an ACK misunderstood as an NACK or an NACK misunderstood as an ACK), the UE determines the number of the CBG level HARQ-ACK bits according to the number of actually scheduled CBGs.

Where, it is determined that the CBG indication in the DCI is inconsistent with the CBG level HARQ-ACK fed back by the UE to the base station includes that:

only when at least one NACK is misunderstood as an ACK, it is determined to be inconsistent;

alternatively, at least one ACK is misunderstood as a NACK, or at least one NACK is misunderstood as an ACK.

Where, it is determined that the CBG indication in the DCI is consistent with the CBG level HARQ-ACK fed back by the UE to the base station includes that:

all NACKs and ACKs are decoded correctly; or all NACKs are decoded correctly, and at least one ACKs is misunderstood as an NACK.

For convenience of description, some necessary assumptions are made first: the UE is configured to determine the number of CBG level HARQ-ACK bits according to the actually scheduled CBGs, and feedback a corresponding HARQ-ACK. It is assumed that inconsistency is defined that only when an NACK is misunderstood as an ACK, it is determined to be inconsistency. Consistency is defined that all NACKs are decoded correctly and at least one ACK is misunderstood as an NACK.

It is assumed that the number of configured CBGs is 4 for the UE, when a TB is initially transmitted, the TB is divided into 4 CBGs (generally, the number of actually scheduled CBGs is always less than or equal to the number of configured CBGs. For example, if the number of configured CBGs is 8, when a TB is initially transmitted, the TB includes 4 CBs, then the TB will be divided into 4 CBGs, and each CBG includes one CB. Thus, the number of actually scheduled CBGs for this TB is 4).

Based on the above assumptions, the acknowledgement information generation and feedback process of data on the UE side and the base station side includes:

the UE receives the TB, it is assumed that according to 4 CBGs, a CBG-level HARQ-ACK is formed (it is assumed that each CBG corresponds to 1-bit HARQ-ACK, or multiple CBGs may correspond to 1-bit HARQ-ACK), and the UE feeds back the HARQ-ACK to the base station. It is assumed that when the UE decodes the TB, part of the CBGs is not decoded correctly. Correctly decoding of a CBG means that all CBs contained in the CBG are decoded correctly, such as, a cyclic redundancy check (CRC) check is passed, for example, third and fourth CBGs are not decoded correctly, and first and second CBGs are decoded correctly, at this time, the UE feeds back "1100", 1 indicates an ACK, and 0 indicates an NACK. The base station receives the HARQ-ACK fed back by the UE, when the base station decodes as "1110", first and second ACKs are decoded correctly, third NACK is misunderstood as an ACK, and fourth NACK is decoded correctly. According to this example, this decoding belongs to inconsistency (if the base station decodes as "1000", the first ACK is decoded correctly, the second ACK is misunderstood as an NACK, the third and fourth NACK are decoded correctly, and this decoding belongs to consistency according to this example). When the base station retransmits the CBG corresponding to an NACK, i.e., retransmits the fourth CBG, CBG indication information is carried on DCI of the CBG scheduled to be retransmitted (this information is used to indicate which CBG/CBGs is/are retransmitted in a bitmap manner, such as the CBG indication information of "1110" in this example, 0 indicates retransmission of the CBG at a corresponding position, 1 indicates that the CBG at a corresponding position is new data or has been correctly received last time, which does not need to be retransmitted; the CBG indication information may also be "0001", which has the meaning opposite to the previous representation). The UE receives the DCI, and may know whether the base station has correctly decoded the CBG level HARQ-ACK fed back last time through the CBG indication information, so as to determine inconsistency or consistency. Then, according to the determination result, a method of forming a CBG level HARQ-ACK is determined. The present example should be inconsistent. Therefore, the UE feeds back the CBG level HARQ-ACK bits according to the number of configured CBGs, such as a 4-bit HARQ-ACK, and this 4-bit HARQ-ACK is fed back. According to the HARQ-ACK feedback received in this transmission, the base station will find that there is a 4-bit HARQ-ACK at this time through detection by itself, at this time, the UE will synthesize a previous CBG decoding result and a current CBG decoding result to acquire feedback information of current time as "1101" (it is assumed that fourth CBG in this transmission is correctly decoded), instead of a 1-bit HARQ-ACK corresponding to the number of actually scheduled CBGs being 1, at this moment, the base station considers that the HARQ-ACK fed back by the UE has not been decoded correctly for data transmitted last time, and the CBG to be retransmitted should be re-determined according to the feedback of current time, the base station acquires according to "1101" (it is assumed that the base station has correctly decoded the HARQ-ACK fed back current time by the UE) and retransmits third CBG at this time, in last decoding, the HARQ-ACK corresponding to the third CBG is misunderstood, which is an ACK misunderstood as an NACK. Similar processing occurs in subsequent retransmission.

If the base station decodes the HARQ-ACK fed back by the UE for a first time as "1000", first ACK is decoded correctly, second ACK is misunderstood as an NACK, and third and fourth NACKs are decoded correctly, according to this example, this decoding belongs to the consistency (although an ACK is misunderstood as an NACK here, this misunderstanding only results in one more retransmission of the data, and the base station will not lose a retransmission opportunity, and the CBGs still have an opportunity to be retransmitted). When the base station retransmits the CBG corresponding to an NACK, i.e., retransmits the second, third and fourth CBGs, the CBG indication information is carried on the DCI of a CBG scheduled to be retransmitted (this information is used to indicate which CBG/CBGs is/are retransmitted in a bitmap manner, such as, the CBG indication information of "1000" in this example, 0 indicates retransmission of the CBG at a corresponding position, 1 indicates that a CBG at the corresponding position is new data or has been correctly received last time, which does not need to be retransmitted; the CBG indication information may also be "0111", which has the meaning opposite to the previous representation). The UE receives the DCI, and may know whether the base station has correctly decoded the CBG level HARQ-ACK fed back last time through the CBG indication information, so as to determine inconsistency or consistency. Then, according to the determination result, a method of forming a CBG level HARQ-ACK is determined. This present example should be consistency. Therefore, the UE feeds back CBG level HARQ-ACK bits according to the number of actually scheduled CBGs, such as a 3-bit HARQ-ACK, and this 3-bit HARQ-ACK is fed back. According to the HARQ-ACK feedback received by the base station, the base station will find that there is a 3-bit HARQ-ACK at this time through detection by itself, after the UE combines the previous CBG decoding result with the current CBG decoding result, it may be concluded that the feedback information is "111" (it is assumed the second, third and fourth CBGs transmitted current time are correctly decoded and the TB is correctly decoded) instead of the 4-bit HARQ-ACK corresponding to the number of configured CBGs, the base station considers that for data transmitted last time, the HARQ-ACK fed back by the UE is decoded correctly (or an ACK is misunderstood as an NACK), and a CBG to be retransmitted should be determined again according to this feedback, by this time, the base station acquires according to "111" (it is assumed that the base station has correctly decoded the HARQ-ACK fed back current time by the UE), and the retransmission of a CBG is no longer needed at this time, the UE has correctly received the whole TB. Similar processing occurs in subsequent retransmission. The UE may continue to use a previous decoding result of a CBG with an ACK misunderstood as an NACK, which is practical usable without decoding.

Example Three

This example proposes that the number of CBG level HARQ-ACK bits may be determined according to a number of CBGs in last transmission to notify the base station to retransmit data, based on which, a data acknowledgement information generation and feedback method is proposed, the method includes steps described below.

Step 31, the UE is configured to determine the number of CBG level HARQ-ACK bits according to the number of actually transmitted CBGs.

Where, the operation in this step is optional, for example, when there is no such configuration, the method may also be implemented according to a following feedback, or for a retransmission feedback, other methods are processed identically.

Step 32, the UE determines the CBG level HARQ-ACK bits according to the number of actually transmitted CBGs (assuming each CBG corresponding to one bit), if there is at least one CBG in these CBGs that has not been correctly decoded by the UE, the UE forms a CBG level HARQ-ACK and transmits to the base station.

Step 33, the base station receives a feedback by the UE. Then, according to the received CBG level HARQ-ACK, a CBG marked as an NACK is retransmitted.

Where, the base station schedules a CBG to be retransmitted through DCI, and the DCI includes a CBG indication (the CBG indication is used to indicate which CBG is retransmitted).

Step 34, the UE receives a CBG to be retransmitted by the base station (or the UE receives a TB to be retransmitted by the base station), if the UE determines that the CBG indication in the DCI is inconsistent with the CBG level HARQ-ACK fed back by the UE to the base station, the base station and the UE behave as follows:

1) the UE forms and feeds back a CBG level HARQ-ACK bit according to the number of CBGs transmitted last time.

2) since the base station side does not know the number of CBG level HARQ-ACK bits fed back by the UE, the base station side needs to detect (also called as blind detection) according to two cases respectively, for example, in the first case, the base station receives and detects the CBG level HARQ-ACK fed back by the UE according to the number of actually transmitted CBGs; in the second case, the base station receives and detects the CBG level HARQ-ACK fed back by the UE according to the number of CBGs in last transmission. When one of the above cases is successful, there is no need to implement the other.

If the base station successfully detects the CBG level HARQ-ACK fed back current time according to the first case, the base station considers the CBG level HARQ-ACK received last time as correct. If the base station successfully detects the CBG level HARQ-ACK fed back current time according to the second case, the base station considers that decoding of the CBG level HARQ-ACK received last time as incorrect.

3) the base station determines a retransmitted CBG according to the CBG level HARQ-ACK fed back current time by the UE. Especially for the second case, the base station retransmits a CBG fed back with an NACK according to the received CBG level HARQ-ACK.

It is considered that a false probability of the base station receiving the CBG level HARQ-ACK is small, so the base station preferentially performs detection according to the first case, which may reduce detection complexity of the base station.

In addition, if the UE determines that the CBG indication in the DCI is consistent with the CBG level HARQ-ACK fed back by the UE to the base station (including an ACK misunderstood as an NACK or an NACK misunderstood as an ACK), the UE determines the number of the CBG level HARQ-ACK bits according to the number of actually scheduled CBGs.

Where, it is determined that the CBG indication in the DCI is inconsistent with the CBG level HARQ-ACK fed back by the UE to the base station includes that:

only when at least one NACK is misunderstood as an ACK, it is determined to be inconsistent;

alternatively, at least one ACK is misunderstood as a NACK, or at least one NACK is misunderstood as an ACK.

Where, it is determined that the CBG indication in the DCI is consistent with the CBG level HARQ-ACK fed back by the UE to the base station includes that:

all NACKs and ACKs are decoded correctly; or all NACKs are decoded correctly, and at least one ACK is misunderstood as an NACK.

A practical application is taken as an example to illustrate a detail implementation process of this example. The practical application scene is almost as same as the assumptions in example two, which will not be repeated here. There is a difference, when the UE determines as inconsistency, the UE determines the CBG level HARQ-ACK bits according to the number of CBGs transmitted last time; if the UE determines as consistency, the UE determines the CBG level HARQ-ACK bits according to the actually scheduled CBGs. For a definition of the number of CBGs transmitted last time, for example, if it is first retransmission, the number of CBGs transmitted last time refers to a number of CBGs in the CBG level HARQ-ACK fed back by UE in the initial transmission; if it is second retransmission, the number of CBGs transmitted last time refers to a number of CBGs in the CBG level HARQ-ACK fed back by UE in the first retransmission; and so on. The number of CBGs fed back by the UE in the first transmission (the initial transmission) may be the number of configured CBGs or the number of actually scheduled CBGs. If retransmission for multiple times occurs and the base station side has a misunderstanding of the HARQ-ACK, for example, the inconsistency occurs, this example is conducive to further progress and reduce an overhead of the CBG level HARQ-ACK bits.

For convenience of description, some necessary assumptions are made first: the UE is configured to determine the number of CBG level HARQ-ACK bits according to the actually scheduled CBGs, and feedback a corresponding HARQ-ACK. It is assumed that inconsistency is defined that only when at least one NACK is misunderstood as an ACK, it is determined as inconsistent. Consistency is defined that all NACKs are decoded correctly and at least one ACK is misunderstood as an NACK.

It is assumed that the number of configured CBGs is 4 for the UE, when a TB is initially transmitted, and the TB is divided into 4 CBGs (generally, the number of actually scheduled CBGs is always less than or equal to the number of configured CBGs).

The UE receives the TB, it is assumed that 4 CBGs form a CBG-level HARQ-ACK (it is assumed that each CBG corresponds to a 1-bit HARQ-ACK, or multiple CBGs may correspond to a 1-bit HARQ-ACK), and the UE feeds back the HARQ-ACK to the base station. It is assumed that when the UE decodes the TB, part of the CBGs is not decoded correctly (correctly decoding of a CBG means that all CBs contained in the CBG are decoded correctly, such as, a CRC check is passed), for example, third and fourth CBGs are not decoded correctly, and first and second CBGs are decoded correctly, at this time, the UE feeds back "1100", 1 indicates an ACK, and 0 indicates an NACK. The base station receives the HARQ-ACK fed back by the UE, when the base station decodes as "1100" and the base station has correctly decoded. Then the base station retransmits the third and fourth CBGs to the UE.

When the base station retransmits a CBG corresponding to an NACK, i.e., retransmits the third and fourth CBGs, CBG indication information is carried on the DCI of a CBG scheduled to be retransmitted (this information is used to indicate which CBG/CBGs is/are retransmitted in a bitmap manner, such as, the CBG indication information of "1100" in this example, 0 indicates retransmission of the CBG at a corresponding position, 1 indicates that a CBG at the corresponding position is new data or has been correctly received last time, which does not need to be retransmitted; the CBG indication information may also be "0001", which has the meaning opposite to the previous representation).

The UE receives the DCI, and the UE may know whether the base station has correctly decoded the CBG level HARQ-ACK fed back last time through the CBG indication information, so as to determine inconsistency or consistency. Then, according to the determination result, a method of forming a CBG level HARQ-ACK is determined. This example should be consistency. Therefore, the UE feeds back CBG level HARQ-ACK bits formed according to the number of actually scheduled CBGs, such as a 2-bit HARQ-ACK. It is assumed here that the third and fourth CBGs (CBGs in the initial transmission are third and fourth CBGs, if it is described with respect to the first retransmission, they are first and second CBGs of two CBGs in the first retransmission) have not been correctly decoded by the UE. At this time, the CBG level HARQ-ACK fed back by the UE is "00", and then transmits.

According to the HARQ-ACK feedback received in current transmission, the base station will find that there is a 2-bit HARQ-ACK at this time, instead of a 4-bit HARQ-ACK corresponding to the number of CBGs of 4 transmitted last time through detection by itself, at this time, the base station considers that for the data transmitted last time, the HARQ-ACK fed back by the UE is decoded correctly, and a CBG to be retransmitted should be determined according to this feedback. The HARQ-ACK feedback decoded by the base station this time is "10" (it is assumed that the base station has not correctly decoded the HARQ-ACK fed back by the UE), and the fourth CBG (it is described with respect to CBGs in the initial transmission) will be retransmitted at this time.

The base station retransmits the fourth CBG and carries the CBG indication information through the DCI, at this time, the CBG indication information is "1110", that is, the base station considers that the UE side has correctly received first, second and third CBGs, only the fourth CBG is retransmitted. The UE receives the DCI and acquires from the CBG indication information that "00" fed back last time is decoded as "10" by the base station (corresponding to third and fourth bits in the CBG indication information, and corresponding to the third and fourth CBGs in the initial transmission). The UE determines that it belongs to inconsistency. The UE decodes CBGs in second retransmission, it is assumed that the UE has correctly decoded fourth CBG retransmitted this time, when the UE feeds back a CBG level HARQ-ACK current time according to the number of CBGs corresponding to last transmission, at this time, the number is 2, and the information formed by the UE is "01", that is, first CBG (third CBG from the initial transmission) of two CBGs in last transmission is still not correctly decoded, which needs to be retransmitted. The base station decodes a current feedback from the UE and finds that it is 2-bit instead of 1-bit corresponding to the number of actually scheduled CBGs, at this moment, the base station considers that last feedback from the UE has been misunderstood. Then the base station acquires according to a current received feedback of "01" (it is assumed the base station has correctly decoded the feedback information) that it still needs to retransmit first CBG (the third CBG from the initial transmission), and then the base station retransmits the CBG. Similar processing occurs in subsequent retransmission.

Example Four

This example is similar to the above example three, a difference between example four and example three is that the base station and UE agree that the CBG level HARQ-ACK bits to be fed back in current transmission (current transmission includes retransmission) is always determined according to the number of CBGs transmitted in last transmission or the number of CBGs transmitted in initial transmission. That is, the base station and the UE agree that for the initial transmission and subsequent retransmission of the transmission block, the number of CBG level HARQ-ACK bits fed back by the UE is determined according to the number of CBGs transmitted in the initial transmission (or last transmission) of the transmission block.

For a definition of the number of CBGs transmitted last time, for example, if it is first retransmission, the number of CBGs transmitted last time refers to the number of CBGs in the CBG level HARQ-ACK fed back by the UE in the initial transmission (or the number of CBGs transmitted last time refers to the number of CBGs transmitted in the initial transmission); if it is second retransmission, the number of CBGs transmitted last time refers to the number of CBGs in the CBG level HARQ-ACK fed back by the UE in first retransmission; and so on. However, the number of CBGs fed back by the UE in the first transmission (the initial transmission) may be the number of configured CBGs or the number of actually scheduled CBGs.

Since both the base station and the UE know the number of CBGs transmitted last time, the number of CBG-level HARQ-ACK bits fed back by the UE each time is also determined, and the UE does not need to determine whether the CBG indication in the DCI is inconsistent or consistent with the CBG-level HARQ-ACK fed back by the UE to the base station as example three. It may be seen that example four has slightly increased a feedback overhead compared with example three, but the overhead is still small compared with example two, which avoids blind detection of different feedback bits by the base station, the detection complexity is reduced, which can also overcome the problem of a TB decoding error on the UE side caused by a retransmission error in related arts.

Other behaviors of the base station and UE are acquired according to or with reference to example three.

For the appointment between the base station and the UE, the CBG level HARQ-ACK bits to be fed back transmitted in current transmission (current transmission includes retransmission) is always determined according to the number of CBGs transmitted in the initial transmission. Further there is supplemental content as follows:

when the UE is configured with CBG retransmission or transmission, the base station configures a number of CBGs for the UE.

Behaviors of the base station are summarized that: the base station always determines the CBG-level HARQ-ACK bits (the number, since not only the number of bits but also values of bits are determined here) according to the number of CBGs scheduled in the initial transmission, and receives the CBG-level HARQ-ACK fed back by the UE; the base station determines a CBG to be retransmitted according to the received CBG level HARQ-ACK, and performs retransmission.

For a transmission block, the base station transmits the transmission block to the UE, then receives the CBG level HARQ-ACK bits fed back by the UE, and determines a CBG to be retransmitted according to the HARQ-ACK bits. When the base station receives the CBG level HARQ-ACK bits fed back by UE, the base station determines formation of the CBG level HARQ-ACK bits according to an appointed rule. For the initial transmission of the transmission block, the base station determines the number of CBG level HARQ-ACK bits fed back by the UE as the number of CBGs transmitted in the initial transmission of the transmission block (it is noted: after the transmission block is received by the UE, the UE divides CBs in the transmission block into CBGs according to a rule appointed with the base station, thus the number of CBGs is formed. Since the base station knows the number of CBs in the transmission block and the rule for dividing the CBs into CBGs, the base station knows the number of CBGs formed by the UE). When the transmission block is retransmitted (including that part or all data of the transmission block or CBGs is retransmitted), which includes subsequent multiple times of retransmission, the base station determines that the number of CBG level HARQ-ACK bits fed back by the UE each time is the number of CBGs transmitted in the initial transmission of the transmission block.

Behaviors of the UE are summarized that: the UE always determines the CBG level HARQ-ACK bits according to the number of CBGs scheduled in the initial transmission (because not only the number of bits but also the values of bits are determined here), generates a CBG level HARQ-ACK, and feeds it back to the base station.

For one transmission of the transmission block, the UE receives and decodes the transmission block, CBs in the transmission block are divided into CBGs according to the appointed rule, and then corresponding CBG level HARQ-ACK bits for the CBGs are formed, and fed back to the base station. When the transmission block is initially transmitted, the UE determines the number of CBG level HARQ-ACK bits according to the number of transmitted CBGs. For the transmission block is retransmitted (including that part or all data of the transmission block or CBGs is retransmitted), which includes subsequent multiple times of retransmission, the UE determines the number of CBG level HARQ-ACK bits fed back each time according to the number of CBGs transmitted in the initial transmission of the transmission block. In this way, during the initial transmission and retransmission of the transmission block, if the base station mistakenly decodes the CBG level HARQ-ACK fed back by the UE for a certain time, the UE may continue to feedback the HARQ-ACK corresponding to a CBG with a decoding error by the base station in a subsequent retransmission feedback, when the base station finds that there is a misunderstanding of a previous CBG level HARQ-ACK after receiving a subsequent CBG level HARQ-ACK, the base station retransmits the misunderstood CBG.

The above transmission block includes multiple CBs, and each CBG includes at least one CB.

There a practical example as follows.

For example, the base station configures the number of CBGs as 8 for the UE, such as, it is configured through radio resource control (RRC) signaling, and this value is also a maximum value of the number of CBGs that the UE may feedback for each transmission block. Another important function of this value is to determine that a number of bits of a CBG indication in the DCI is 8. In this way, it may ensure that the number of bits of the CBG indication in the DCI is fixed or fixed internally during a RRC configuration, thus the DCI format may be prevented from changing caused by the number of bits and complexity of blind detection by the UE is reduced. It is also possible to configure 8 by the base station through the RRC, then a number of CBGs (less than or equal to the number of CBGs configured by the RRC) is dynamically configured through physical layer signaling, such as DCI. In this way, the DCI configured by the physical layer signaling may also be the number of CBGs transmitted (or scheduled) this time by the base station.

When a transmission block is transmitted, the transmission block includes 4 CBs, after receiving the transmission block, the UE forms 4 CBGs (denoted as CBG0, CBG1, CBG2, CBG3) according to the appointed rule, and each CBG includes one CB. The UE decodes the transmission block and forms HARQ-ACK bits corresponding to the CBGs according to the number of CBs of 4, such as "1100". Then the UE transmits the HARQ-ACK bits to the base station. According to the appointment, the base station reckons that the CBG level HARQ-ACK fed back by the UE has 4 bits according to the transmission block transmitted this time containing 4 CBs. Therefore, the base station decodes the feedback from the UE according to 4-bit valid information. For example, a decoding result is "1110", then the base station retransmits CBG3, the UE receives the CBG 3, for example, if the CBG3 has not been decoded correctly, then the UE feeds back a CBG level HARQ-ACK bit with 4 bits, such as, "1100", (according to the number of CBGs transmitted in the initial transmission of the transmission block), and continues to feed back "0" for CBG 2; the base station still decodes the feedback from the UE according to the 4 bits, such as, "1100", the base station retransmits the CBG2 and CBG3, the UE receives and decodes, such as, "1111" is fed back, the number of feedback bits is still based on the number of CBGs transmitted in the initial transmission of the transmission block, instead of the fed back CBG level HARQ-ACK bits are determined according to the number of CBGs scheduled current time or the number of configured CBGs.

Compared with other examples, the overhead in this example is slightly increased, but the number of CBG level HARQ-ACK bits fed back in the initial transmission and in each retransmission of the transmission block is kept unchanged, and the base station does not need blind detection of decoding. It can solve the problem that retransmission of a CBG is not accurate enough, since the base station continuously repeatedly incorrectly decodes the CBG level HARQ-ACK continuously fed back by the UE, but the base station considers that the transmission block is successfully transmitted while the UE considers that the transmission block is incorrectly transmitted.

Example Five

Example five is modified on the basis of example one, that is, the indication A information in example 1 may be fed back to the base station along with the CBG level HARQ-ACK bits in examples two, three and four. For example, under special circumstances, it may still have some effects. For example, after retransmission for multiple times, the UE lets a CB or CBG of the retransmission for multiple times pass the CRC check, but the CRC check of a TB corresponding to that CB or CBG of the retransmission for multiple times fails, in this case, the indication A may notify the UE to retransmit the TB. Indication A may be set as 1 or 0 to describe different cases, such as, retransmission of the TB, no retransmission of the TB or the above examples; it is also possible to indicate whether the indication A exists (does not exist means that the indication A is not transmitted) to describe different cases, such as retransmission of the TB, no retransmission of the TB or the above examples.

In the above examples one to five, description of these method steps is used in order to clearly describe an implementation of the technical solutions of the present application, but the present application does not limit the sequence of each above-mentioned method step, that is, the execution sequence of one or more method steps may be adjusted according to requirements and scenes in a practical application. In addition, the above examples one to five are described in combination with operations on the UE side and the base station side at the same time, but the implementation of the solutions of the present application is not limited to a joint operation between the UE side and the base station side, and correspondingly, these operations may be respectively executed on the UE side or the base station side according to an actual application situation to realize the technical solutions of the present application.

One of ordinary skill in the art may understand that all or part of the steps in the above methods may be completed by instructing relevant hardware through a program, which may be stored in a computer readable storage medium, such as a read-only memory, a magnetic disk or an optical disk, etc. In an embodiment, all or part of the steps in the above embodiments may also be implemented using one or more integrated circuits. Correspondingly, each module/unit in the above embodiments may be implemented in the form of hardware or software functional modules. The present application is not limited to any specific combination of hardware and software.

What is claimed is:

1. A data acknowledgement information generation and feedback method, comprising:
    determining, by user equipment (UE), an actual valid code block group (CBG) level hybrid automatic repeat request acknowledgement (HARQ-ACK) bit of a transmission block according to a number of CBGs actually scheduled in initial transmission of the transmission block,
generating an HARQ-ACK containing the actual valid CBG level HARQ-ACK bit, and transmitting the HARQ-ACK containing the actual valid CBG level HARQ-ACK bit;
    wherein determining, by the UE, the actual valid CBG level HARQ-ACK bit of the transmission block according to the number of CBGs actually scheduled in the initial transmission of the transmission block comprises:
    in response to the initial transmission of the transmission block or retransmission of the transmission block, determining, by the UE, the actual valid CBG level HARQ-ACK bit of the transmission block according to the number of CBGs actually scheduled in the initial transmission of the transmission block, and a number of the actual valid CBG level HARQ-ACK bit of the transmission block to be equal to the number of CBGs actually scheduled in the initial transmission of the transmission block;
    wherein the number of CBGs actually scheduled in the initial transmission of the transmission block is determined according to a number of code blocks (CBs) contained in the transmission block and a number of configured CBGs and
    wherein the retransmission of the transmission block comprises retransmission of partial or all CBGs of the transmission block; and the retransmission of the transmission block further comprises performing at least one retransmission of the transmission block.

2. The method according to claim 1, wherein the number of CBGs actually scheduled in the initial transmission of the transmission block comprises:
    in a case of the number of configured CBGs being greater than the number of CBs contained in the transmission block, setting the number of CBGs actually scheduled for transmission of the transmission block as the number of CBs contained in the transmission block.

3. The method according to claim 1, wherein determining the actual valid CBG level HARQ-ACK bit of the transmission block further comprises determining a value of the actual valid CBG level HARQ-ACK bit by at least one of:
    in a case of the UE performing an HARQ-ACK feedback on retransmission of the transmission block, feeding back a positive acknowledgement (ACK) for a previously correctly received CBG;
    in a case of the UE performing the HARQ-ACK feedback on the retransmission of the transmission block, feeding back a negative acknowledgement (NACK) for a CBG to be retransmitted that is not retransmitted current time; or
    in a case of the UE performing the HARQ-ACK feedback on the retransmission of the transmission block, determining a feedback for a CBG to be retransmitted that has been retransmitted current time as an ACK or NACK according to a decoding result of the CBG;
    wherein, the CBG to be retransmitted comprises a CBG that is not correctly received by the UE previously, or a CBG that is previously fed back with an NACK by the UE.

4. The method according to claim 1, wherein a CB contained in each CBG of the retransmitted transmission block is identical with a CB contained in the each CBG in the initial transmission of the transmission block.

5. The method according to claim 1, further comprising:
    in response to retransmission of the transmission block, corresponding, by the UE, each of the CBGs actually scheduled in the initial transmission to one HARQ-ACK bit according to the CBGs actually scheduled in the initial transmission of the transmission block.

6. The method according to claim 1, further comprising:
    in a case where the UE generates the HARQ-ACK containing the actual valid CBG level HARQ-ACK bit, adding first indication information, and
    feeding back the HARQ-ACK containing the actual valid CBG level HARQ-ACK bit and the first indication information simultaneously to a base station, wherein the first indication information comprises one of:
    notifying the base station to retransmit the whole transmission block;
    notifying the base station to reckon a CBG to be retransmitted next time according to an appointed reckoning rule in combination with a CBG of current retransmission; or
    notifying the base station of incorrect decoding of the HARQ-ACK containing the actual valid CBG level HARQ-ACK bit last time.

7. The method according to claim 1, wherein the number of CBGs actually scheduled in the initial transmission of the transmission block comprises:
in a case of the number of configured CBGs being greater than the number of CBs contained in the transmission block, setting the number of CBGs actually scheduled for transmission of the transmission block as the number of CBs contained in the transmission block.

8. A data acknowledgement information receiving method, comprising:
determining, by a base station, an actual valid code block group (CBG) level hybrid automatic repeat request acknowledgement (HARQ-ACK) bit of a transmission block according to a number of CBGs actually scheduled in initial transmission of the transmission block,
receiving an HARQ-ACK containing the actual valid CBG-level HARQ-ACK bit of the transmission block;
determining, by the base station, a CBG to be retransmitted according to the received HARQ-ACK containing the actual valid CBG-level HARQ-ACK bit, and
retransmitting the determined CBG to be retransmitted;
wherein determining, by the base station, the actual valid CBG level HARQ-ACK bit of the transmission block according to the number of CBGs actually scheduled in the initial transmission of the transmission block comprises: in response to the initial transmission or retransmission of the transmission block, determining, by the base station, the actual valid CBG level HARQ-ACK bit of the transmission block according to the number of CBGs actually scheduled in the initial transmission of the transmission block, and a number of the actual valid CBG level HARQ-ACK bit of the transmission block to be equal to the number of CBGs actually scheduled in the initial transmission of the transmission block; wherein the number of CBGs actually scheduled in the initial transmission of the transmission block is determined according to a number of code blocks (CBs) contained in the transmission block and a number of configured CBGs and
wherein the retransmission of the transmission block comprises retransmission of partial or all CBGs of the transmission block; and the retransmission of the transmission block further comprises performing at least one retransmission of the transmission block.

9. The method according to claim 8, wherein the number of CBGs actually scheduled in the initial transmission of the transmission block comprises:
in a case of the number of configured CBGs being greater than the number of CBs contained in the transmission block, setting the number of CBGs actually scheduled for transmission of the transmission block as the number of CBs contained in the transmission block.

10. The method according to claim 8, wherein determining, by the base station, the CBG to be retransmitted according to the received HARQ-ACK containing the actual valid CBG-level HARQ-ACK bit comprises:
determining, by the base station, a CBG to be retransmitted according to an HARQ-ACK fed back by user equipment (UE) current time.

11. The method according to claim 8, further comprising:
in response to retransmission of the transmission block, verifying, by the base station, that the UE corresponds each of the CBGs actually scheduled in the initial transmission of the transmission block to one HARQ-ACK bit according to the CBGs actually scheduled in the initial transmission of the transmission block.

12. The method according to claim 8, wherein a CB contained in each CBG of the retransmitted transmission block is identical with a CB contained in the each CBG in the initial transmission of the transmission block.

13. The method according to claim 8, further comprising:
in a case where the base station receives the HARQ-ACK containing the actual valid CBG level HARQ-ACK bit, in response to further receiving first indication information, determining, by the base station, a CBG to be retransmitted according to the HARQ-ACK containing the actual valid CBG level HARQ-ACK bit and the first indication information fed back by the UE; wherein
in a case where the first indication information comprises notifying the base station to retransmit the transmission block, retransmitting, by the base station, the transmission block, wherein retransmitting the transmission block comprises retransmitting the transmission block for once or dividing the transmission block into a plurality of parts and retransmitting the plurality of parts through a plurality of times;
in a case where the first indication information comprises notifying the base station to reckon a CBG to be retransmitted next time according to an appointed reckoning rule in combination with a CBG of current retransmission, determining, by the base station, each CBG in the transmission block except a CBG which is correctly transmitted in current transmission, and retransmitting the determined each CBG; and
in a case where the first indication information comprises notifying the base station of incorrect decoding of the HARQ-ACK containing the actual valid CBG level HARQ-ACK bit last time, retransmitting, by the base station, the whole transmission block.

14. The method according to claim 8, wherein the number of CBGs actually scheduled in the initial transmission of the transmission block comprises:
in a case of the number of configured CBGs being greater than the number of CBs contained in the transmission block, setting the number of CBGs actually scheduled for transmission of the transmission block as the number of CBs contained in the transmission block.

15. A data acknowledgement information generation and feedback method, comprising:
determining, by user equipment (UE), a code block (CB) contained in each code block group (CBG) in retransmission of a transmission block to be identical with a CB contained in the each CBG in initial transmission of the transmission block, and determining a value of an actual valid CBG level hybrid automatic repeat request acknowledgement (HARQ-ACK) bit of the transmission block according to at least one of:
in a case of the UE performing an HARQ-ACK feedback on the retransmission of the transmission block, feeding back a positive acknowledgement (ACK) for a previously correctly received CBG;
in a case of the UE performing the HARQ-ACK feedback on the retransmission of the transmission block, feeding back a negative acknowledgement (NACK) for a CBG to be retransmitted that is not retransmitted current time; or
in a case of the UE performing the HARQ-ACK feedback on the retransmission of the transmission block, determining a feedback for a CBG to be retransmitted that has been retransmitted current time as an ACK or NACK according to a decoding result of the CBG;

wherein the CBG to be retransmitted comprises a CBG that is not correctly received by the UE previously or a CBG that is previously fed back with an NACK by the UE;

wherein determining the actual valid CBG level HARQ-ACK bit of the transmission block comprises:

in response to the initial transmission of the transmission block or the retransmission of the transmission block, determining, by the UE, the actual valid CBG level HARQ-ACK bit of the transmission block according to a number of CBGs actually scheduled in the initial transmission of the transmission block, and a number of the actual valid CBG level HARQ-ACK bit of the transmission block to be equal to the number of CBGs actually scheduled in the initial transmission of the transmission block;

wherein the number of CBGs actually scheduled in the initial transmission of the transmission block is determined according to a number of CBs contained in the transmission block and a number of configured CBGs and wherein the retransmission of the transmission block comprises retransmission of partial or all CBGs of the transmission block; and the retransmission of the transmission block further comprises performing at least one retransmission of the transmission block.

16. The method according to claim 15, wherein the number of CBGs actually scheduled in the initial transmission of the transmission block comprises:

in a case of the number of configured CBGs being greater than the number of CBs contained in the transmission block, setting the number of CBGs actually scheduled for transmission of the transmission block as the number of CBs contained in the transmission block.

17. The method according to claim 15, further comprising:

in response to the retransmission of the transmission block, corresponding, by the UE, each of the CBGs actually scheduled in the initial transmission to one HARD-ACK bit according to the CBGs actually scheduled in the initial transmission of the transmission block.

* * * * *